United States Patent
Kumano et al.

(10) Patent No.: US 8,032,784 B2
(45) Date of Patent: Oct. 4, 2011

(54) DUPLICATION COMBINATION MANAGEMENT PROGRAM, DUPLICATION COMBINATION MANAGEMENT APPARATUS, AND DUPLICATION COMBINATION MANAGEMENT METHOD

(75) Inventors: Tatsuo Kumano, Kawasaki (JP); Kazutaka Ogihara, Kawasaki (JP); Masahisa Tamura, Kawasaki (JP); Yoshihiro Tsuchiya, Kawasaki (JP); Tetsutaro Maruyama, Kawasaki (JP); Takashi Watanabe, Kawasaki (JP); Yasuo Noguchi, Kawasaki (JP); Riichiro Take, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 35 days.

(21) Appl. No.: 12/544,035

(22) Filed: Aug. 19, 2009

(65) Prior Publication Data

US 2009/0307524 A1  Dec. 10, 2009

Related U.S. Application Data

(63) Continuation of application No. PCT/JP2007/058632, filed on Apr. 20, 2007.

(51) Int. Cl.
    G06F 11/00  (2006.01)
(52) U.S. Cl. .................... 714/6.2; 714/47.1; 711/162
(58) Field of Classification Search ............ 714/5, 6, 714/47, 6.2, 47.1, 5.1; 711/114, 161, 162
    See application file for complete search history.

(56) References Cited

U.S. PATENT DOCUMENTS

| | | | |
|---|---|---|---|
| 5,611,069 A | | 3/1997 | Matoba |
| 5,822,782 A | * | 10/1998 | Humlicek et al. ............ 711/170 |
| 7,191,283 B2 | * | 3/2007 | Amemiya et al. ............ 711/114 |
| 7,376,862 B2 | * | 5/2008 | Hajji et al. ........................ 714/6 |
| 7,530,000 B2 | * | 5/2009 | Fairhurst et al. .............. 714/742 |
| 2003/0074523 A1 | * | 4/2003 | Johnson ........................ 711/112 |
| 2005/0043978 A1 | * | 2/2005 | Chainer et al. .................... 705/7 |
| 2005/0044313 A1 | * | 2/2005 | Amemiya et al. ............ 711/114 |
| 2005/0222817 A1 | * | 10/2005 | Achacoso et al. ............ 702/185 |
| 2005/0289387 A1 | * | 12/2005 | Hajji et al. ........................ 714/6 |
| 2008/0010499 A1 | * | 1/2008 | Vingralek ........................ 714/6 |

FOREIGN PATENT DOCUMENTS

| | | |
|---|---|---|
| EP | 0 913 763 A2 | 5/1999 |
| JP | A 6-187101 | 7/1994 |
| JP | A 7-129331 | 5/1995 |
| JP | A 11-134114 | 5/1999 |
| JP | A 2000-13581 | 1/2000 |
| JP | A 2000-99274 | 4/2000 |
| JP | A 2002-500393 | 1/2002 |
| JP | A 2004-171113 | 6/2004 |
| JP | A 2006-260008 | 9/2006 |
| WO | WO 99/34291 A1 | 7/1999 |

* cited by examiner

*Primary Examiner* — Yolanda L Wilson

(74) *Attorney, Agent, or Firm* — Greer, Burns & Crain, Ltd.

(57) ABSTRACT

A simultaneous failure occurrence degree calculation section calculates a simultaneous failure occurrence degree a value of which becomes smaller with an increase in a difference between numeric values indicative of manufacture date information on a computer which performs a process on the basis of a duplication combination management program. A combination pattern generation section then combines two of a plurality of storage apparatus and generates a plurality of combination patterns. A simultaneous failure occurrence degree adding section then calculates a total of simultaneous failure occurrence degrees corresponding to combinations of storage apparatus for each of the plurality of combination patterns. A duplication combination pattern determination section then determines that a combination pattern for which the total of simultaneous failure occurrence degrees is the smallest is a duplication combination pattern.

10 Claims, 17 Drawing Sheets

512 SIMULTANEOUS FAILURE OCCURRENCE DEGREE TABLE STORAGE SECTION

512a SIMULTANEOUS FAILURE OCCURRENCE DEGREE TABLE

|      | SN-A  | SN-B | SN-C | SN-D  |
|------|-------|------|------|-------|
| SN-A | –     | 0.5  | 0.25 | 0.125 |
| SN-B | 0.5   | –    | 0.5  | 0.25  |
| SN-C | 0.25  | 0.5  | –    | 0.5   |
| SN-D | 0.125 | 0.25 | 0.5  | –     |

FIG. 10

DUPLICATION COMBINATION MANAGEMENT PROGRAM, DUPLICATION COMBINATION MANAGEMENT APPARATUS, AND DUPLICATION COMBINATION MANAGEMENT METHOD

This application is a continuing application, filed under 35 U.S.C. §111(a), of International Application PCT/JP2007/058632, filed on Apr. 20, 2007.

FIELD

The embodiments discussed herein are related to a duplication combination management program, a duplication combination management apparatus, and a duplication combination management method for determining a combination of storage apparatus between which data duplication is performed.

BACKGROUND

Mirroring may be performed in a storage system for which high reliability is needed. A mirroring technique is used so that data duplication will be performed between two hard disk drives. Even if a failure occurs in one hard disk drive, data can be read out from the other hard disk drive by performing mirroring. This prevents the data from being lost (from not being restored).

However, even if data duplication is performed, the following problem arises. If failures occur simultaneously in the two hard disk drives between which data duplication is performed, then the data is lost. Failures rarely occur simultaneously in the two hard disk drives from different causes. It is assumed that failures occur simultaneously in the two hard disk drives. In many cases, the failures are caused by a problem which arises at the time of manufacturing the two hard disk drives.

Accordingly, the following method is proposed. In order to realize data redundancy, a magnetic storage device and a semiconductor memory device are used for forming a mirroring pair. By realizing data redundancy by the use of storage apparatus of different types, simultaneous failures from the same cause can be prevented (see, for example, Japanese Laid-open Patent Publication No. 2006-260008).

By the way, if mirroring is performed between storage apparatus of different types, data access speed depends on a lower-performance storage apparatus. As a result, efficiency in data access falls. For example, it is assumed that mirroring is performed between a magnetic hard disk drive and a semiconductor memory device. Data stored on the semiconductor memory device can be accessed at a high speed. However, data access cannot be completed until access to data stored on the magnetic hard disk drive is completed. That is to say, the data access performance of the semiconductor memory device is not demonstrated and its capability is not utilized effectively.

To form a mirroring pair by the use of two storage apparatus which are equal in performance is fundamental in performing mirroring while utilizing the capability of each storage apparatus effectively. Therefore, each ordinary redundant array of independent disks (RAID) system having a mirroring function includes the same model of a plurality of hard disk drives manufactured by the same enterprise. The same model of hard disk drives are equal in data access performance and their performance can be demonstrated sufficiently.

However, the same failures may occur in industrial products, such as hard disk drives, manufactured as a specific lot at a factory. Usually such failures are referred to as lot failures. Such lot failures occur not only in hard disk drives but also in all the other storage apparatus including semiconductor memory devices. If lot failures occur in storage apparatus manufactured as a specific lot at a factory and mirroring is performed between two storage apparatus included in the lot, then there is a very high probability that the two storage apparatus will break down simultaneously.

SUMMARY

According to one aspect of the embodiments, a computer readable record medium on which a duplication combination management program for determining a combination of storage apparatus between which data duplication is performed is recorded makes a computer function as: a simultaneous failure occurrence degree storage section which stores a simultaneous failure occurrence degree; a manufacture date information acquisition section which acquires manufacture date information set as numeric values corresponding to dates of manufacture of a plurality of storage apparatus from the plurality of storage apparatus; a simultaneous failure occurrence degree calculation section which calculates a difference between numeric values indicative of the manufacture date information for each combination of two storage apparatus on the basis of the manufacture date information acquired by the manufacture date information acquisition section, calculates a simultaneous failure occurrence degree a value of which becomes smaller with an increase in the difference between the numeric values indicative of the manufacture date information, and stores the simultaneous failure occurrence degree in association with each combination of two storage apparatus in the simultaneous failure occurrence degree storage section; a combination pattern generation section which combines two of the plurality of storage apparatus and which generates a plurality of combination patterns; a simultaneous failure occurrence degree adding section which acquires simultaneous failure occurrence degrees corresponding to combinations of storage apparatus for each of the plurality of combination patterns generated by the combination pattern generation section from the simultaneous failure occurrence degree storage section, and calculates a total of the simultaneous failure occurrence degrees acquired; a duplication combination pattern determination section which determines that a combination pattern for which the total of the simultaneous failure occurrence degrees calculated by the simultaneous failure occurrence degree adding section is the smallest is a duplication combination pattern; and a mirroring instruction section which sends a mirroring section that performs mirroring by the use of the plurality of storage apparatus instructions to perform mirroring by the use of combinations of two storage apparatus included in the duplication combination pattern determined by the duplication combination pattern determination section.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

FIG. 10 illustrates an example data structure of a simultaneous failure occurrence degree table;

DESCRIPTION OF EMBODIMENT(S)

Figure 1:
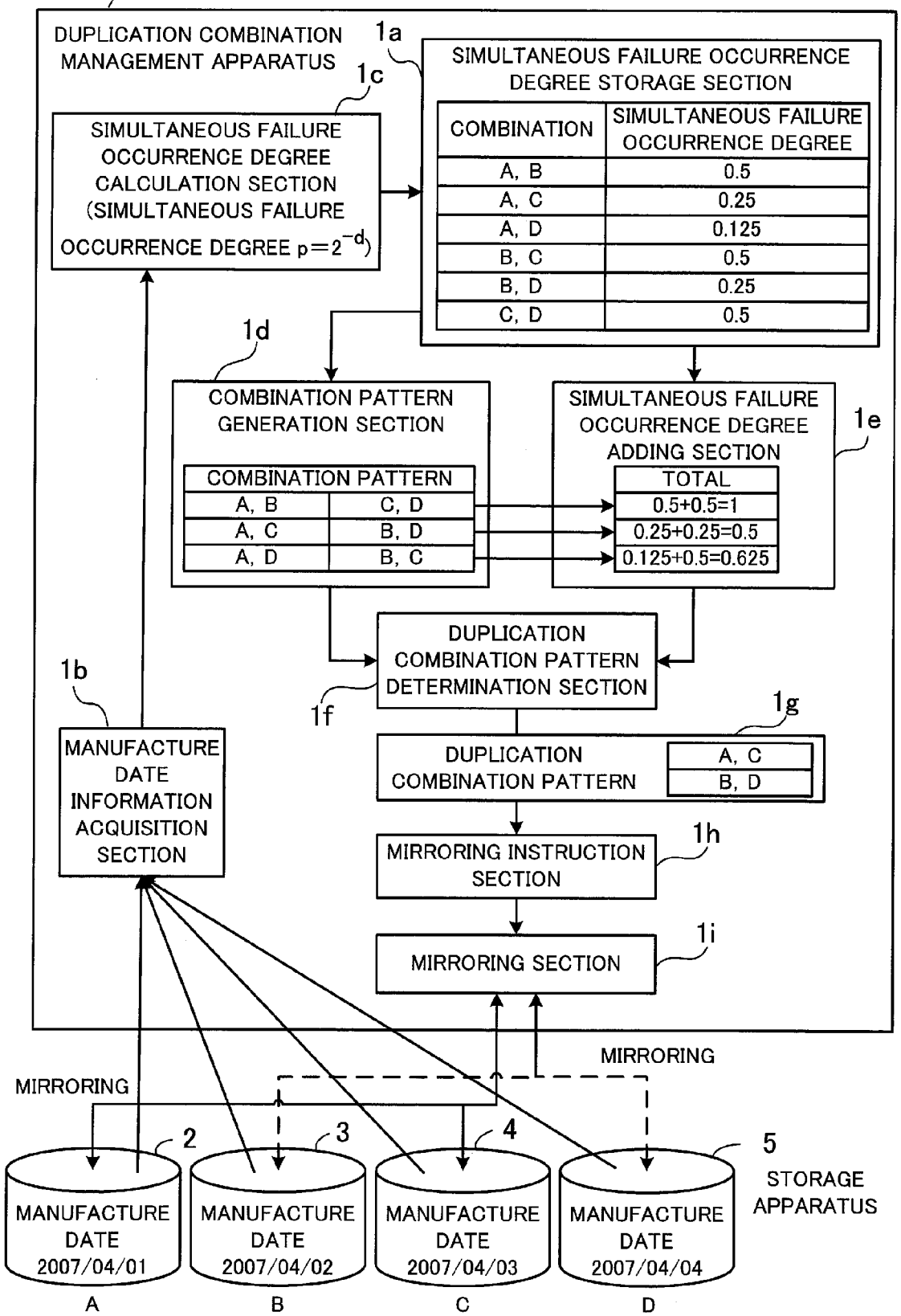
FIG. 1 is a view for giving an overview of the present invention.

Embodiments of the present invention will now be described with reference to the accompanying drawings, wherein like reference numerals refer to like elements throughout.

FIG. 1 is a view for giving an overview of the present invention. To determine a combination of storage apparatus between which data duplication is performed, a duplication combination management apparatus 1 comprises a simultaneous failure occurrence degree storage section 1a, a manufacture date information acquisition section 1b, a simultaneous failure occurrence degree calculation section 1c, a combination pattern generation section 1d, a simultaneous failure occurrence degree adding section 1e, a duplication combination pattern determination section 1f, a mirroring instruction section 1h, and a mirroring section 1i.

The simultaneous failure occurrence degree storage section 1a stores a simultaneous failure occurrence degree. A simultaneous failure occurrence degree is a numeric value indicative of the possibility that failures will occur simultaneously in two storage apparatus which form a combination. A high value of a simultaneous failure occurrence degree indicates that there is a strong possibility that failures occur simultaneously in the two storage apparatus.

The manufacture date information acquisition section 1b acquires manufacture date information set as numeric values corresponding to dates of manufacture of storage apparatus 2 through 5 from the storage apparatus 2 through 5. For example, the manufacture date information acquisition section 1b acquires manufacture date information when operation input is provided to give instructions to determine a duplication combination pattern. The manufacture date information is at least a standard for determining the difference between manufacture dates. For example, if exact dates of the manufacture of the storage apparatus 2 through 5 can be acquired, then the exact dates of the manufacture of the storage apparatus 2 through 5 are acquired as the manufacture date information.

If the exact dates of the manufacture of the storage apparatus 2 through 5 cannot be acquired, then other pieces of information for determining the difference between manufacture dates can be used as the manufacture date information. For example, if a manufacturer's serial numbers are given to the storage apparatus 2 through 5 in ascending order, then the difference between manufacture dates can be estimated to some extent from the manufacturer's serial numbers. If 10,000 storage apparatus are manufactured per day, then a difference of 10,000 in manufacturer's serial number can be converted to a difference of a day in manufacture date. Accordingly, if the manufacture date information acquisition section 1b cannot acquire an exact manufacture date, then the manufacture date information acquisition section 1b may acquire a manufacturer's serial number as the manufacture date information.

The simultaneous failure occurrence degree calculation section 1c calculates a difference between numeric values indicative of the manufacture date information regarding each combination of two storage apparatus on the basis of the manufacture date information acquired by the manufacture date information acquisition section 1b. In addition, the simultaneous failure occurrence degree calculation section 1c calculates a simultaneous failure occurrence degree a value of which becomes smaller as the difference between the numeric values indicative of the manufacture date information widens. For example, the simultaneous failure occurrence degree calculation section 1c considers a predetermined constant and the difference between the numeric values indicative of the manufacture date information as a base and an index number, respectively, and treats an inverse number of the power of the predetermined constant as the simultaneous failure occurrence degree. The simultaneous failure occurrence degree calculation section 1c then associates the simultaneous failure occurrence degree with the combination of two storage apparatus and stores the simultaneous failure occurrence degree in the simultaneous failure occurrence degree storage section 1a.

The combination pattern generation section 1d combines two of the storage apparatus 2 through 5 and generates a plurality of combination patterns.

The simultaneous failure occurrence degree adding section 1e acquires simultaneous failure occurrence degrees corresponding to combinations of storage apparatus included in each of the plurality of combination patterns generated by the combination pattern generation section 1d from the simultaneous failure occurrence degree storage section 1a. The simultaneous failure occurrence degree adding section 1e then calculates a total of the simultaneous failure occurrence degrees acquired.

The duplication combination pattern determination section 1f determines that a combination pattern for which the total of simultaneous failure occurrence degrees calculated by the simultaneous failure occurrence degree adding section 1e is the smallest is a duplication combination pattern 1g.

The mirroring instruction section 1h sends the mirroring section 1i that performs mirroring by the use of the storage apparatus 2 through 5 instructions to perform mirroring by the use of combinations of two storage apparatus included in the duplication combination pattern 1g determined by the duplication combination pattern determination section 1f.

The mirroring section 1*i* performs mirroring by the use of the combination of two storage apparatus indicated by the duplication combination pattern 1*g*. In FIG. 1, the mirroring section 1*i* is included in the duplication combination management apparatus 1, but the mirroring section 1*i* may be included in another computer connected via a network.

By using the duplication combination management apparatus 1 having the above structure, the manufacture date information regarding the storage apparatus 2 through 5 is acquired by the manufacture date information acquisition section 1*b*. In this example, for example, the dates of the manufacture of the storage apparatus 2 through 5 are 1 Apr. 2007, 2 Apr. 2007, 3 Apr. 2007, and 4 Apr. 2007 respectively.

The simultaneous failure occurrence degree calculation section 1*c* then calculates a simultaneous failure occurrence degree for each combination of storage apparatus a value of which becomes smaller with an increase in a difference between numeric values indicative of the manufacture date information. For example, it is assumed that the difference in manufacture date (in days) is used as an index number and that an inverse number of the power of 2 is set as the simultaneous failure occurrence degree. A simultaneous failure occurrence degree for each combination of storage apparatus is indicated in FIG. 1. That is to say, a simultaneous failure occurrence degree for a combination of the storage apparatus 2 having the name "A" and the storage apparatus 3 having the name "B" is 0.5, a simultaneous failure occurrence degree for a combination of the storage apparatus 2 having the name "A" and the storage apparatus 4 having the name "C" is 0.25, a simultaneous failure occurrence degree for a combination of the storage apparatus 2 having the name "A" and the storage apparatus 5 having the name "D" is 0.125, a simultaneous failure occurrence degree for a combination of the storage apparatus 3 having the name "B" and the storage apparatus 4 having the name "C" is 0.5, a simultaneous failure occurrence degree for a combination of the storage apparatus 3 having the name "B" and the storage apparatus 5 having the name "D" is 0.25, and a simultaneous failure occurrence degree for a combination of the storage apparatus 4 having the name "C" and the storage apparatus 5 having the name "D" is 0.5.

After a simultaneous failure occurrence degree for each combination of storage apparatus is calculated, the combination pattern generation section 1*d* combines two of the storage apparatus 2 through 5 and generates a plurality of combination patterns. For example, the combination pattern generation section 1*d* refers to the simultaneous failure occurrence degree storage section 1*a*, recognizes combinations of storage apparatus which can be generated, and generates combination patterns each of which includes combinations of storage apparatus and which can be generated without duplication of a storage apparatus. In this example, no less than three combination patterns can be generated. A first combination pattern includes the combination of the storage apparatus 2 having the name "A" and the storage apparatus 3 having the name "B" and the combination of the storage apparatus 4 having the name "C" and the storage apparatus 5 having the name "D." A second combination pattern includes the combination of the storage apparatus 2 having the name "A" and the storage apparatus 4 having the name "C" and the combination of the storage apparatus 3 having the name "B" and the storage apparatus 5 having the name "D." A third combination pattern includes the combination of the storage apparatus 2 having the name "A" and the storage apparatus 5 having the name "D" and the combination of the storage apparatus 3 having the name "B" and the storage apparatus 4 having the name "C."

After the plurality of combination patterns are generated, the simultaneous failure occurrence degree adding section 1*e* calculates a total of simultaneous failure occurrence degrees corresponding to combinations of storage apparatus included in each of the plurality of combination patterns. In this example, for example, the total of the simultaneous failure occurrence degrees for the first combination pattern is 1. The total of the simultaneous failure occurrence degrees for the second combination pattern is 0.5. The total of the simultaneous failure occurrence degrees for the third combination pattern is 0.625.

After the total of simultaneous failure occurrence degrees for each combination pattern is calculated, the duplication combination pattern determination section 1*f* determines that a combination pattern for which the total of the simultaneous failure occurrence degrees is the smallest is the duplication combination pattern 1*g*. In this example, the total of the simultaneous failure occurrence degrees for the second combination pattern is the smallest. Therefore, the duplication combination pattern determination section 1*f* determines that the second combination pattern including the combination of the storage apparatus 2 having the name "A" and the storage apparatus 4 having the name "C" and the combination of the storage apparatus 3 having the name "B" and the storage apparatus 5 having the name "D" is the duplication combination pattern 1*g*.

The mirroring instruction section 1*h* then sends the mirroring section 1*i* that performs mirroring by the use of the storage apparatus 2 through 5 instructions to perform mirroring by the use of combinations of two storage apparatus included in the duplication combination pattern 1*g* determined by the duplication combination pattern determination section 1*f*. After that, the mirroring section 1*i* gains access to data stored on the storage apparatus 2 through 5 for which the mirroring technique is adopted on the basis of the combinations included in the duplication combination pattern 1*g*.

Data duplication can be performed in this way by the use of storage apparatus between the dates of the manufacture of which the longest possible interval exists. As a result, the probability that failures occur simultaneously in storage apparatus between which data duplication is performed can be decreased.

That is to say, if there is a long interval between the dates of the manufacture of storage apparatus, then there is a strong possibility that the storage apparatus belong to different production lots. Moreover, if there is a long interval between the dates of the manufacture of the storage apparatus, then there is a strong possibility that parts used in the storage apparatus belong to different production lots. If the storage apparatus belong to different production lots, then the possibility that the storage apparatus will break down simultaneously due to a lot failure becomes small. As a result, the reliability of a storage system which performs mirroring can be improved.

By the way, FIG. 1 illustrates a system in which one mirroring section 1*i* performs mirroring by controlling the storage apparatus 2 through 5. However, a plurality of computers connected via a network may tie up with one another for performing mirroring. In this case, each computer includes a mirroring section.

Embodiments of the present invention will be described concretely by taking the case where the present invention is applied to a distributed storage system in which mirroring is performed by a plurality of computers as an example.

First Embodiment

Figure 2:
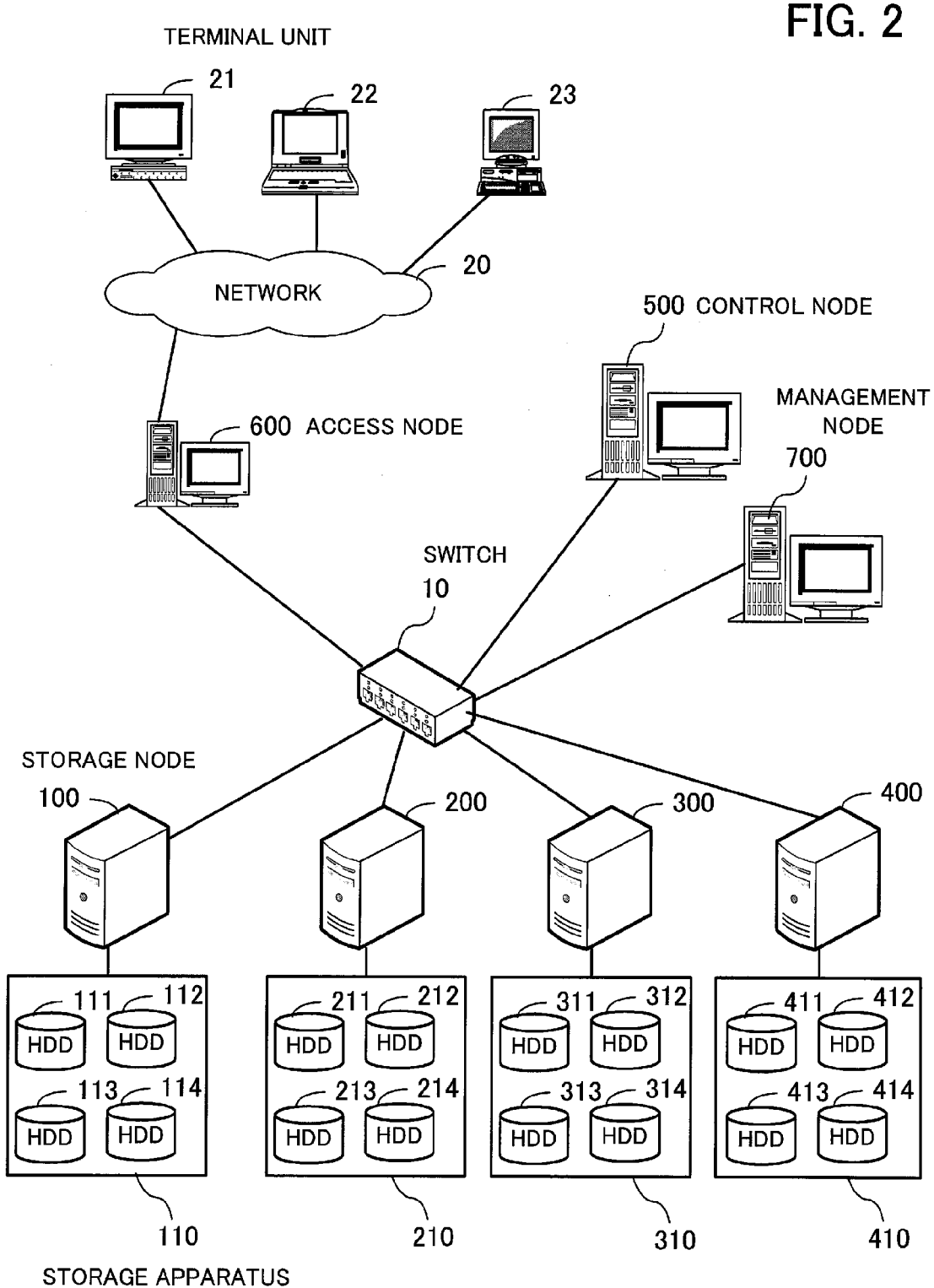
FIG. 2 illustrates an example configuration of a distributed storage system according to an embodiment.

FIG. 2 illustrates an example configuration of a distributed storage system according to an embodiment of the present invention. In this embodiment, storage nodes 100, 200, 300, and 400, a control node 500, an access node 600, and a management node 700 are connected via a switch 10. Storage apparatus 110, 210, 310, and 410 are connected to the storage nodes 100, 200, 300, and 400 respectively. This distributed storage system functions as virtual volumes (hereinafter referred to as logical volumes) for terminal units 21 through 23.

The storage apparatus 110 includes hard disk drives (HDDs) 111, 112, 113, and 114. The storage apparatus 210 includes HDDs 211, 212, 213, and 214. The storage apparatus 310 includes HDDs 311, 312, 313, and 314. The storage apparatus 410 includes HDDs 411, 412, 413, and 414. Each of the storage apparatus 110, 210, 310, and 410 is a RAID system using built-in HDDs. In this embodiment, a RAID5 disk management service is provided by the use of each of the storage apparatus 110, 210, 310, and 410.

Each HDD has a semiconductor storage medium (such as a ROM) in which management information is stored. The date of the manufacture of the HDD is stored in the semiconductor storage medium. When the storage apparatus 110, 210, 310, and 410 are manufactured as RAID systems at a factory, HDDs manufactured at approximately the same time are used in one storage apparatus. Accordingly, in this embodiment it is assumed that the dates of the manufacture of HDDs included in one storage apparatus are the same (or there is only a difference of several days among them).

Each of the storage nodes 100, 200, 300, and 400 is a computer having, for example, architecture referred to as the Intel architecture (IA). The storage nodes 100, 200, 300, and 400 manage data stored in the storage apparatus 110, 210, 310, and 410, respectively, connected thereto and provide the data managed to the terminal units 21, 22, and 23 via the switch 10. In addition, the data managed by the storage nodes 100, 200, 300, and 400 has redundancy. That is to say, the same data is managed by at least two storage nodes.

The control node 500 controls the storage nodes 100, 200, 300, and 400. For example, the control node 500 defines logical volumes created on the storage nodes 100, 200, 300, and 400. Logical volume mirroring is performed by creating a primary slice and a secondary slice on different storage nodes. Part of storage areas in the different storage nodes are assigned as the primary slice and the secondary slice. The control node 500 informs the access node 600 and the storage nodes 100, 200, 300, and 400 of the contents of definitions of the logical volumes. By doing so, the storage node 100, 200, 300, or 400 on each logical volume the address of which is designated can be accessed.

In addition, the control node 500 rearranges slices in accordance with instructions from the management node 700. At this time the control node 500 performs rearrangement so that the longest possible interval will exist between the date of the manufacture of a HDD in a storage apparatus of a storage node in which a primary slice is arranged and the date of the manufacture of a HDD in a storage apparatus of a storage node in which a secondary slice is arranged.

The terminal units 21, 22, and 23 are connected to the access node 600 via a network 20. The access node 600 recognizes locations where the data managed by the storage nodes 100, 200, 300, and 400 is stored. The access node 600 accesses data managed by the storage node 100, 200, 300, or 400 in response to a request from the terminal unit 21, 22, or 23.

The management node 700 is a computer which manages the whole of the distributed storage system. For example, in response to operation input from an administrator the management node 700 sends the control node 500 instructions to rearrange slices.

Figure 3:
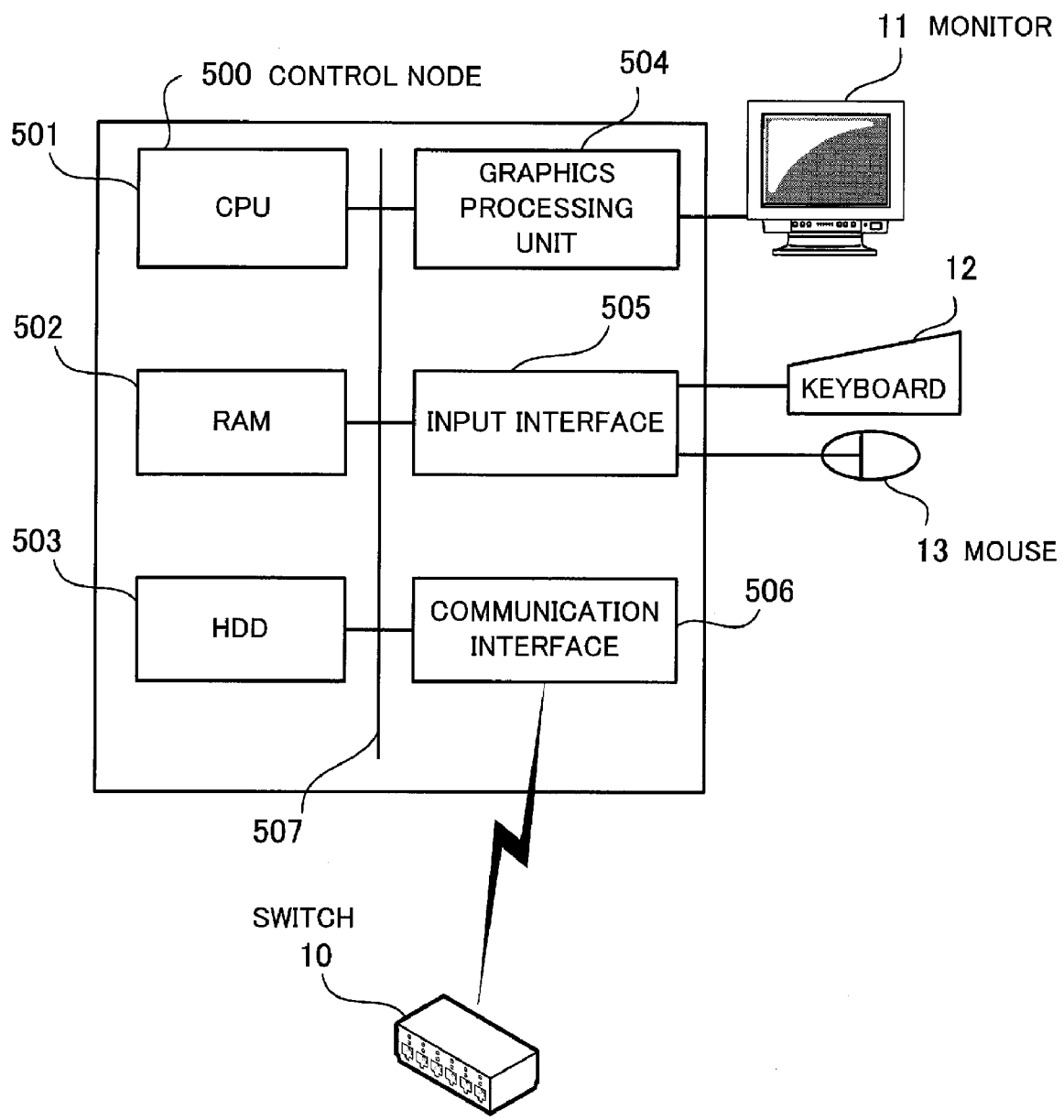
FIG. 3 illustrates an example hardware configuration of a control node used in the embodiment.

FIG. 3 illustrates an example hardware configuration of the control node used in the embodiment. The whole of the control node 500 is controlled by a central processing unit (CPU) 501. A random access memory (RAM) 502, a hard disk drive (HDD) 503, a graphics processing unit 504, an input interface 505, and a communication interface 506 are connected to the CPU 501 via a bus 507.

The RAM 502 temporarily stores at least part of an operating system (OS) or an application program executed by the CPU 501. The RAM 502 also stores various pieces of data which the CPU 501 needs to perform a process. The HDD 503 stores the OS and application programs.

A monitor 11 is connected to the graphics processing unit 504. In accordance with instructions from the CPU 501, the graphics processing unit 504 displays an image on a screen of the monitor 11. A keyboard 12 and a mouse 13 are connected to the input interface 505. The input interface 505 sends a signal sent from the keyboard 12 or the mouse 13 to the CPU 501 via the bus 507.

The communication interface 506 is connected to a switch 10. The communication interface 506 exchanges data with another computer via the switch 10.

By adopting the above-mentioned hardware configuration, the processing function of this embodiment can be realized. FIG. 3 illustrates an example hardware configuration of the control node. However, the storage nodes 100, 200, 300, and 400, the access node 600, the management node 700, and the terminal units 21, 22, and 23 can also be realized by adopting the same hardware configuration.

The data structure of a logical volume will now be described.

Figure 4:
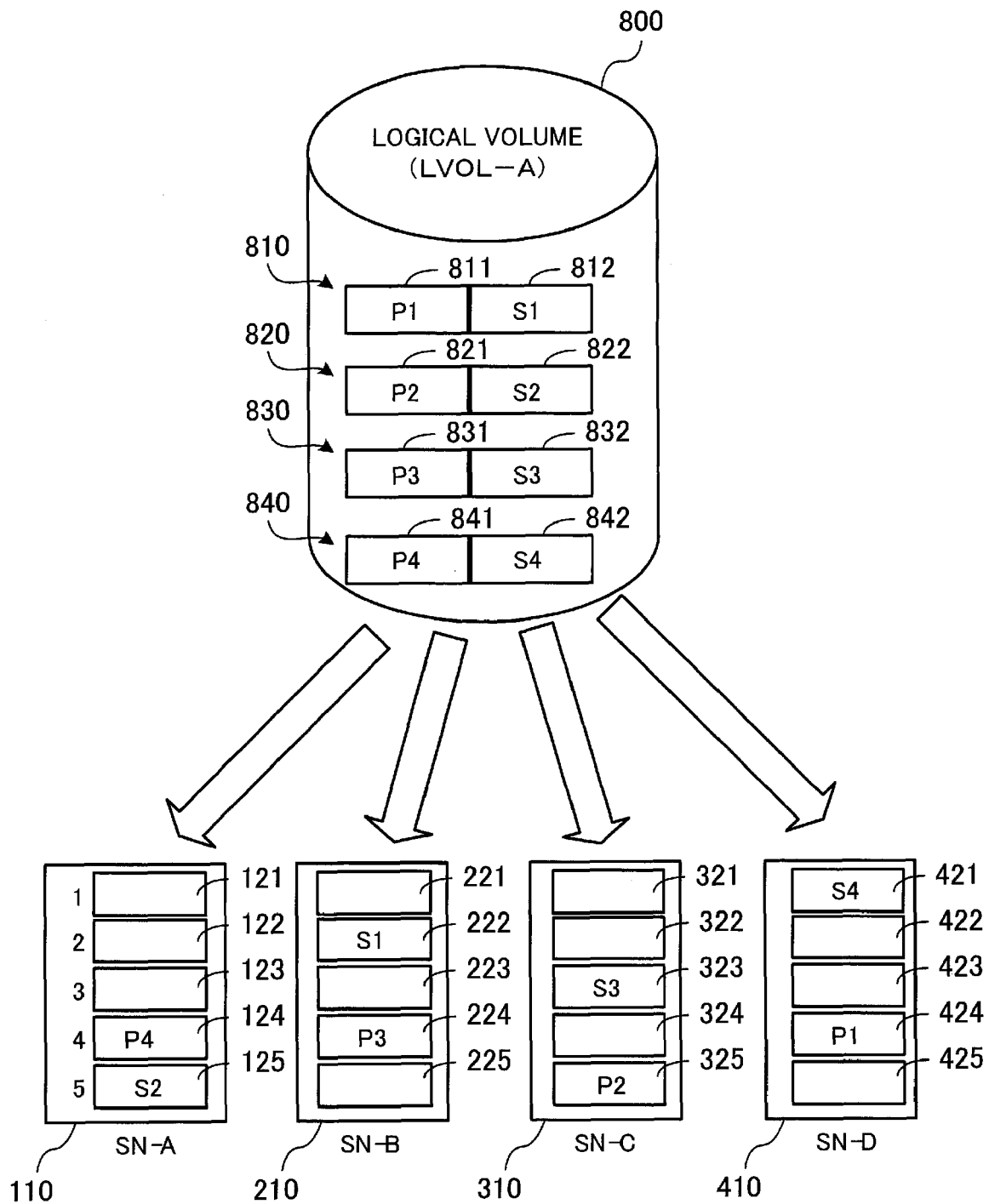
FIG. 4 illustrates the data structure of a logical volume.

FIG. 4 illustrates the data structure of a logical volume. The identifier (logical volume identifier) "LVOL-A" is given to a logical volume 800. Furthermore, node identifiers "SN-A," "SN-B," "SN-C," and "SN-D" are given to the four storage nodes 100, 200, 300, and 400, respectively, connected to one another via the switch 10 for identifying each storage node. The storage apparatus 110, 210, 310, and 410 connected to the storage nodes 100, 200, 300, and 400, respectively, are identified by the node identifiers of the storage nodes 100, 200, 300, and 400.

A RAID5 logical disk is created in each of the storage apparatus 110, 210, 310, and 410 connected to the storage nodes 100, 200, 300, and 400 respectively. Each RAID5 logical disk is divided into five slices and is managed by a corresponding storage node.

In this example, a storage area in the storage apparatus 110 is divided into five slices 121 through 125. A storage area in the storage apparatus 210 is divided into five slices 221 through 225. A storage area in the storage apparatus 310 is divided into five slices 321 through 325. A storage area in the storage apparatus 410 is divided into five slices 421 through 425.

The logical volume 800 is made up of segments 810, 820, 830, and 840. The storage capacity of the segments 810, 820, 830, and 840 is the same as that of a slice which is a management unit in the storage apparatus 110, 210, 310, and 410. For example, if the storage capacity of a slice is 1 gigabyte, then the storage capacity of a segment is also 1 gigabyte. The storage capacity of the logical volume 800 is an integral multiple of the storage capacity of one segment. If the storage capacity of a segment is 1 gigabyte, then the storage capacity of the logical volume 800 is, for example, 4 gigabytes.

The segment 810 includes a combination of a primary slice 811 and a secondary slice 812. The segment 820 includes a combination of a primary slice 821 and a secondary slice 822. The segment 830 includes a combination of a primary slice 831 and a secondary slice 832. The segment 840 includes a combination of a primary slice 841 and a secondary slice 842. Slices included in the same segment belong to different storage nodes. An area for managing each slice includes the logical volume identifier, segment information, information regarding a slice included in the same segment, and a flag. A value indicative of a primary slice, a secondary slice, or the like is stored as the flag.

In this example, a slice identifier is indicated by a combination of the letter "P" or "S" and a number. "P" indicates that the slice is a primary slice. "S" indicates that the slice is a secondary slice. The number following the letter "P" or "S" indicates which segment from the head the slice belongs to. For example, the primary slice and the secondary slice included in the first segment 810 are indicated by "P1" and "S1" respectively.

Each primary slice or secondary slice included in the logical volume 800 having the above structure is associated with a slice in the storage apparatus 110, 210, 310, or 410. For example, the primary slice 811 and the secondary slice 812 in the segment 810 are associated with the slice 424 in the storage apparatus 410 and the slice 222 in the storage apparatus 210 respectively.

Each of the storage apparatus 110, 210, 310, and 410 stores data in a primary slice or a secondary slice corresponding to its slice.

Figure 5:
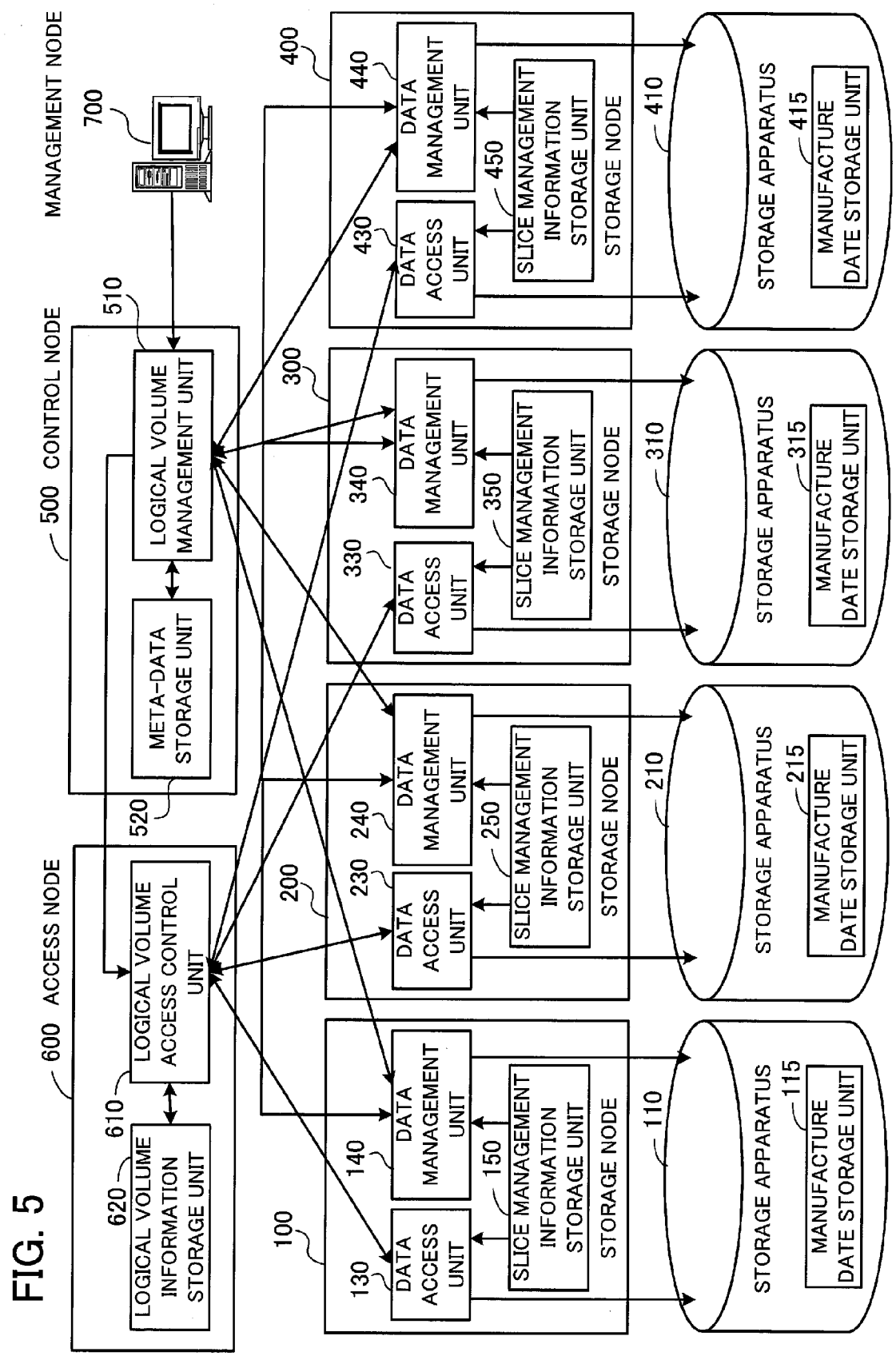
FIG. 5 is a block diagram illustrating the function of each unit included in the distributed storage system.

FIG. 5 is a block diagram illustrating the function of each unit included in the distributed storage system. The access node 600 includes a logical volume access control unit 610 and a logical volume information storage unit 620.

In response to an access request from the terminal unit 21, 22, or 23 in which data in the logical volume 800 is designated, the logical volume access control unit 610 accesses a storage node which manages the data. The number of a segment in the logical volume 800 and the number of a block in the segment are designated in the access request. Accordingly, the logical volume access control unit 610 refers to the logical volume 800 stored in the logical volume information storage unit 620 and determines a storage node which manages a slice (primary slice at the time of normal operation being performed) corresponding to the segment designated in the access request. In addition, when logical volume information is sent from the control node 500 in the case of, for example, assignment of slices to a segment in a logical volume being changed, the logical volume access control unit 610 receives the logical volume information. The logical volume access control unit 610 then stores the logical volume information received in the logical volume information storage unit 620.

The logical volume information storage unit 620 stores logical volume information indicative of correspondence between a primary slice or a secondary slice in each segment in the logical volume 800 and a slice in the storage apparatus 110, 210, 310, or 410. For example, part of a storage area in a HDD included in the access node 600 is used as the logical volume information storage unit 620.

The control node 500 includes a logical volume management unit 510 and a meta-data storage unit 520.

The logical volume management unit 510 manages the slices in the storage apparatus 110, 210, 310, and 410 connected to the storage nodes 100, 200, 300, and 400 respectively. For example, the logical volume management unit 510 assigns slices to each segment in the logical volume 800 when the system is configured. To be concrete, at this time the logical volume management unit 510 determines slices to be assigned so that the longest possible interval will exist between the dates of the manufacture of HDDs in which a primary slice and a secondary slice in each segment between which data duplication is performed are arranged. When the logical volume management unit 510 determines slices to be assigned to each segment, the logical volume management unit 510 updates meta-data in the meta-data storage unit 520. In addition, the logical volume management unit 510 sends corresponding slice management information to the storage nodes 100, 200, 300, and 400. Moreover, the logical volume management unit 510 sends logical volume information indicative of correspondence between a segment in the logical volume and storage nodes on which a primary slice and a secondary slice in the segment are arranged.

When the system is started, the logical volume management unit 510 sends the storage nodes 100, 200, 300, and 400 a slice management information acquisition request. The logical volume management unit 510 then generates meta-data from slice management information returned in response to the slice management information acquisition request and stores the meta-data in the meta-data storage unit 520.

In addition, the logical volume management unit 510 rearranges slices in response to a request from the management node 700. At this time the logical volume management unit 510 determines storage nodes so that the longest possible interval will exist between the date of the manufacture of a HDD in one storage node in which a primary slice is arranged and the date of the manufacture of a HDD in the other storage node in which a corresponding secondary slice is arranged. After the storage nodes in which the primary slice and the corresponding secondary slice are rearranged are determined, the logical volume management unit 510 controls the storage nodes 100, 200, 300, and 400 and copies data in the primary slice and the corresponding secondary slice into storage areas of the storage nodes in which the primary slice and the corresponding secondary slice are rearranged. After the data in the primary slice and the corresponding secondary slice is copied, the logical volume management unit 510 updates meta-data in the meta-data storage unit 520. Furthermore, the logical volume management unit 510 sends the storage nodes 100, 200, 300, and 400 new meta-data. The logical volume management unit 510 also sends logical volume information.

The meta-data storage unit 520 stores meta-data generated from the slice management information acquired from the storage nodes 100, 200, 300, and 400. For example, part of a storage area in the RAM of the control node 500 is used as the meta-data storage unit 520.

The storage node 100 includes a data access unit 130, a data management unit 140, and a slice management information storage unit 150. The storage apparatus 110 connected to the storage node 100 includes a manufacture data storage unit 115. The manufacture data storage unit 115 stores the dates of the manufacture of the HDDs 111 through 114 included in the storage apparatus 110. For example, part of a storage area in a ROM of a controller in the storage apparatus 110 is used as the manufacture data storage unit 115. The date of the manufacture of any one of the HDDs stored in a ROM in the HDD may be considered as the date of the manufacture of the storage apparatus 110.

The data access unit 130 accesses data in the storage apparatus 110 in response to a request from the access node 600. To be concrete, when the data access unit 130 receives a data read request from the access node 600, the access node 600 acquires data designated by the data read request from the storage apparatus 110 and sends the data to the access node 600. When the data access unit 130 receives a data write request from the access node 600, the data access unit 130 stores data included in the data write request in the storage apparatus 110.

The data management unit 140 manages data in the storage apparatus 110. To be concrete, when the data management unit 140 receives a disk manufacture date acquisition request from the control node 500, the data management unit 140 acquires the date of the manufacture of one of the HDDs from a semiconductor record medium in the HDD. If manufacture date information is recorded in a record medium other than the HDDs, such as a ROM, in the storage apparatus, then the manufacture date information recorded in the storage apparatus may be acquired.

The slice management information storage unit 150 stores slice management information. For example, part of a storage area in a RAM of the storage node 100 is used as the slice management information storage unit 150. The slice management information stored in the slice management information storage unit 150 is stored in the storage apparatus 110 at the time of the system being stopped and is read into the slice management information storage unit 150 at the time of the system being started.

The other storage nodes 200, 300, and 400 have the same function as the storage node 100. That is to say, the storage node 200 includes a data access unit 230, a data management unit 240, and a slice management information storage unit 250. The storage node 300 includes a data access unit 330, a data management unit 340, and a slice management information storage unit 350. The storage node 400 includes a data access unit 430, a data management unit 440, and a slice management information storage unit 450. Each unit in the storage nodes 200, 300, and 400 has the same function as a unit in the storage node 100 having the same name.

The storage apparatus 210, 310, and 410 connected to the storage nodes 200, 300, and 400 include manufacture data storage units 215, 315, and 415 respectively. This is the same with the storage apparatus 110.

In the distributed storage system having the above structure, data duplication is performed between HDDs for which a simultaneous failure occurrence degree is small. A slice assignment process by which a simultaneous failure occurrence degree becomes small will now be described.

Figure 6:
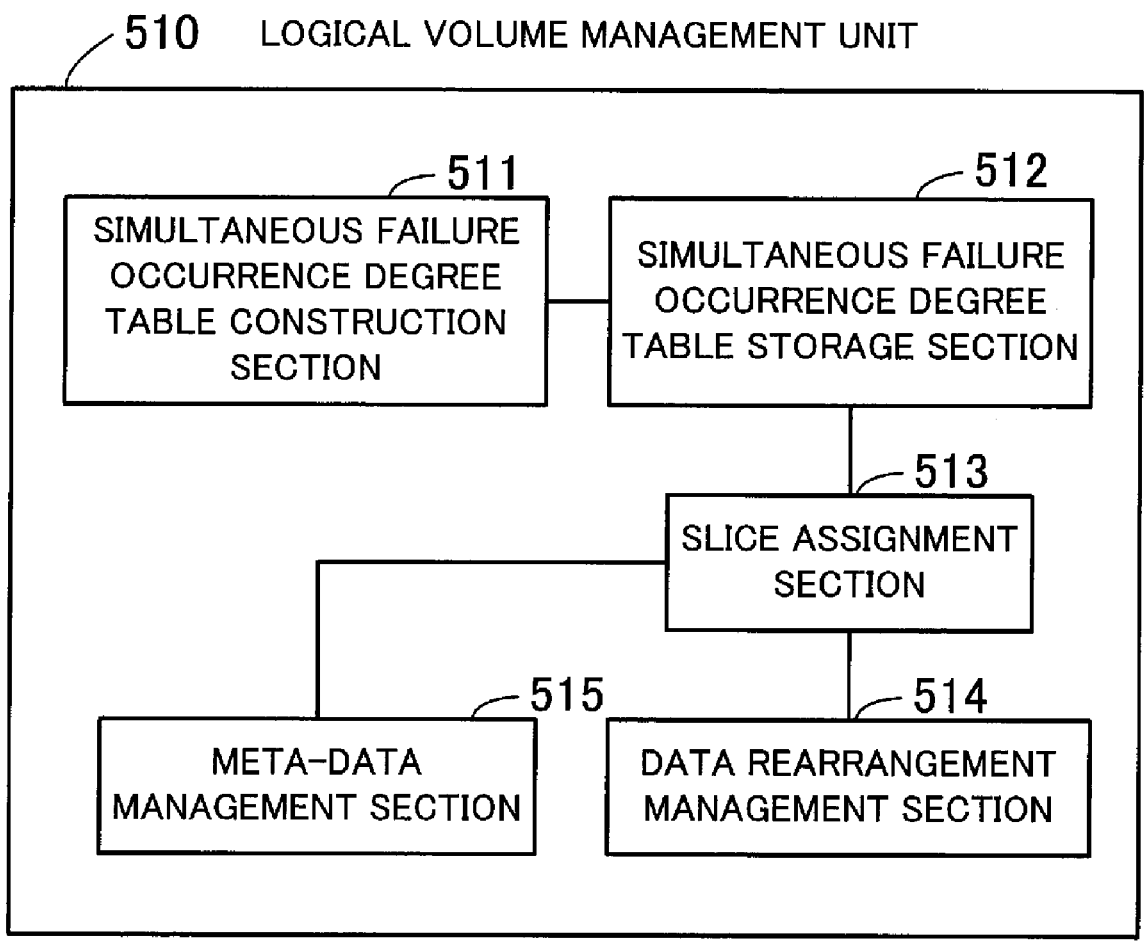
FIG. 6 is a block diagram illustrating the internal function of a logical volume management unit.

FIG. 6 is a block diagram illustrating the internal function of the logical volume management unit. The logical volume management unit 510 includes a simultaneous failure occurrence degree table construction section 511, a simultaneous failure occurrence degree table storage section 512, a slice assignment section 513, a data rearrangement management section 514, and a meta-data management section 515.

The simultaneous failure occurrence degree table construction section 511 constructs a simultaneous failure occurrence degree table when slices are assigned to each segment in a logical volume. A numeric value indicative of the possibility that failures will occur simultaneously in HDDs in two storage nodes which form a combination is registered in the simultaneous failure occurrence degree table.

The simultaneous failure occurrence degree table storage section 512 stores the simultaneous failure occurrence degree table. For example, part of a storage area in the RAM 502 is used as the simultaneous failure occurrence degree table storage section 512.

The slice assignment section 513 refers to the simultaneous failure occurrence degree table and assigns slices to each segment in the logical volume.

The data rearrangement management section 514 rearranges data managed by the storage nodes 100, 200, 300, and 400 on the basis of the result of slice assignment to each segment determined by the slice assignment section 513.

The meta-data management section 515 acquires slice management information from the storage nodes 100, 200, 300, and 400 when the system is started. The meta-data management section 515 then summarizes the slice management information acquired as meta-data and stores the meta-data in the meta-data storage unit 520. In addition, if slice reassignment is performed, the meta-data management section 515 generates slice management information for the storage nodes 100, 200, 300, and 400 on the basis of a result of the slice reassignment and sends the corresponding storage nodes 100, 200, 300, and 400 the slice management information. Furthermore, the meta-data management section 515 updates the meta-data in the meta-data storage unit 520 on the basis of the result of the slice reassignment. The meta-data management section 515 then sends the meta-data after the update to the access node 600.

Figure 7:
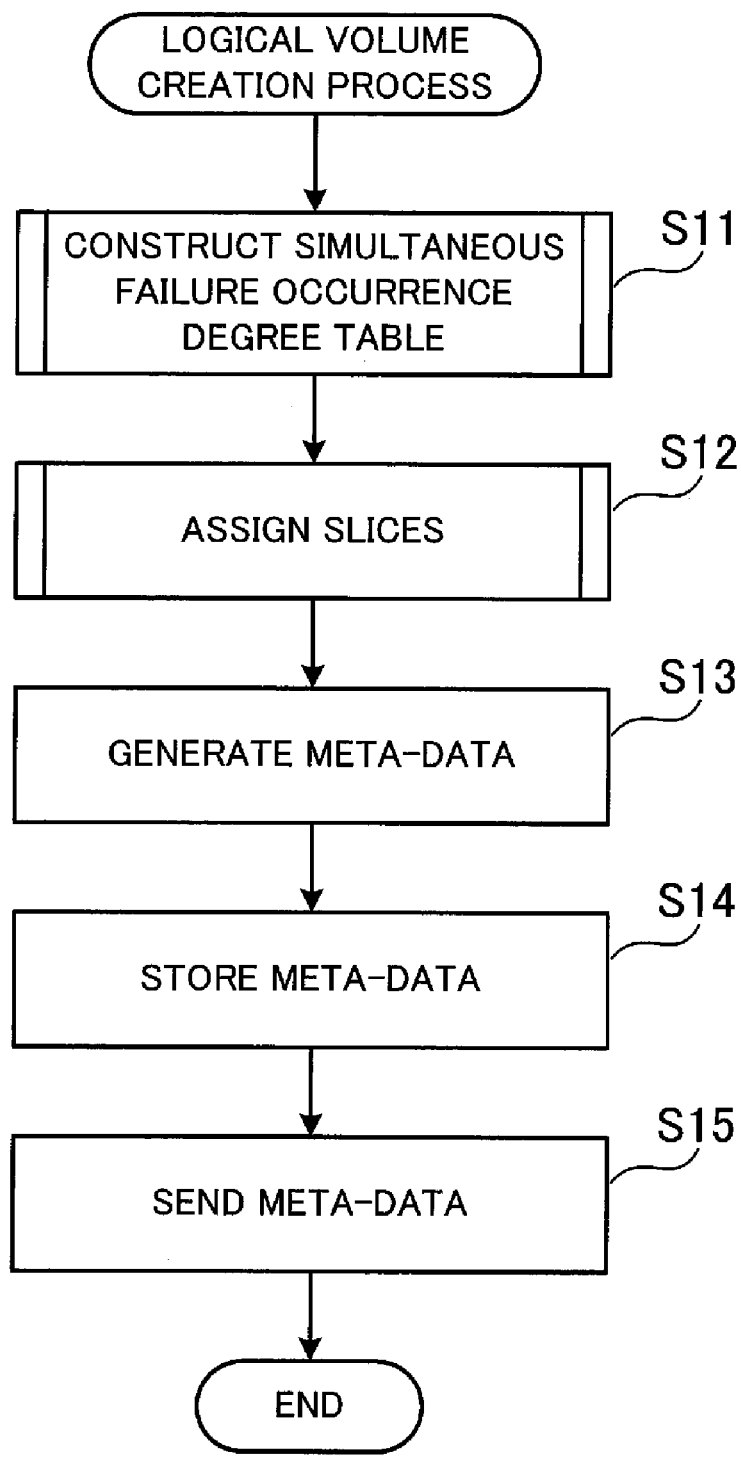
FIG. 7 illustrates a procedure for a logical volume creation process.

FIG. 7 illustrates a procedure for a logical volume creation process. The process depicted in FIG. 7 will now be described in order of step number. The process illustrated in FIG. 7 is performed when conditions under which a logical volume is created are inputted from the management node 700. Conditions under which a logical volume is created include a logical volume identifier, the number of segments which make up the logical volume, and the like.

Step S11: The simultaneous failure occurrence degree table construction section 511 in the logical volume management unit 510 constructs a simultaneous failure occurrence degree table. By doing so, the simultaneous failure occurrence degree table is constructed and is stored in the simultaneous failure occurrence degree table storage section 512. The details of this step will be described later (see FIG. 8).

Step S12: On the basis of the simultaneous failure occurrence degree table in the simultaneous failure occurrence degree table storage section 512, the slice assignment section 513 assigns slices to each segment in the logical volume so that a simultaneous failure occurrence degree for storage apparatus between which data duplication is performed will become small. A result of the assignment is passed to the meta-data management section 515. The details of this step will be described later (see FIG. 11).

Step S13: The meta-data management section 515 generates meta-data on the basis of the result of the slice assignment to each segment determined by the slice assignment section 513. The meta-data generated includes slice management information for each storage node. The slice management information includes one slice managed by a corresponding storage node and information regarding another slice. Mirroring is performed between these two slices.

Step S14: The meta-data management section 515 stores the meta-data generated in the meta-data storage unit 520.

Step S15: The meta-data management section 515 sends the storage nodes 100, 200, 300, and 400 the corresponding slice management information. In addition, the meta-data management section 515 sends the access node 600 the meta-data.

The details of a process for constructing the simultaneous failure occurrence degree table will now be described.

Figure 8:
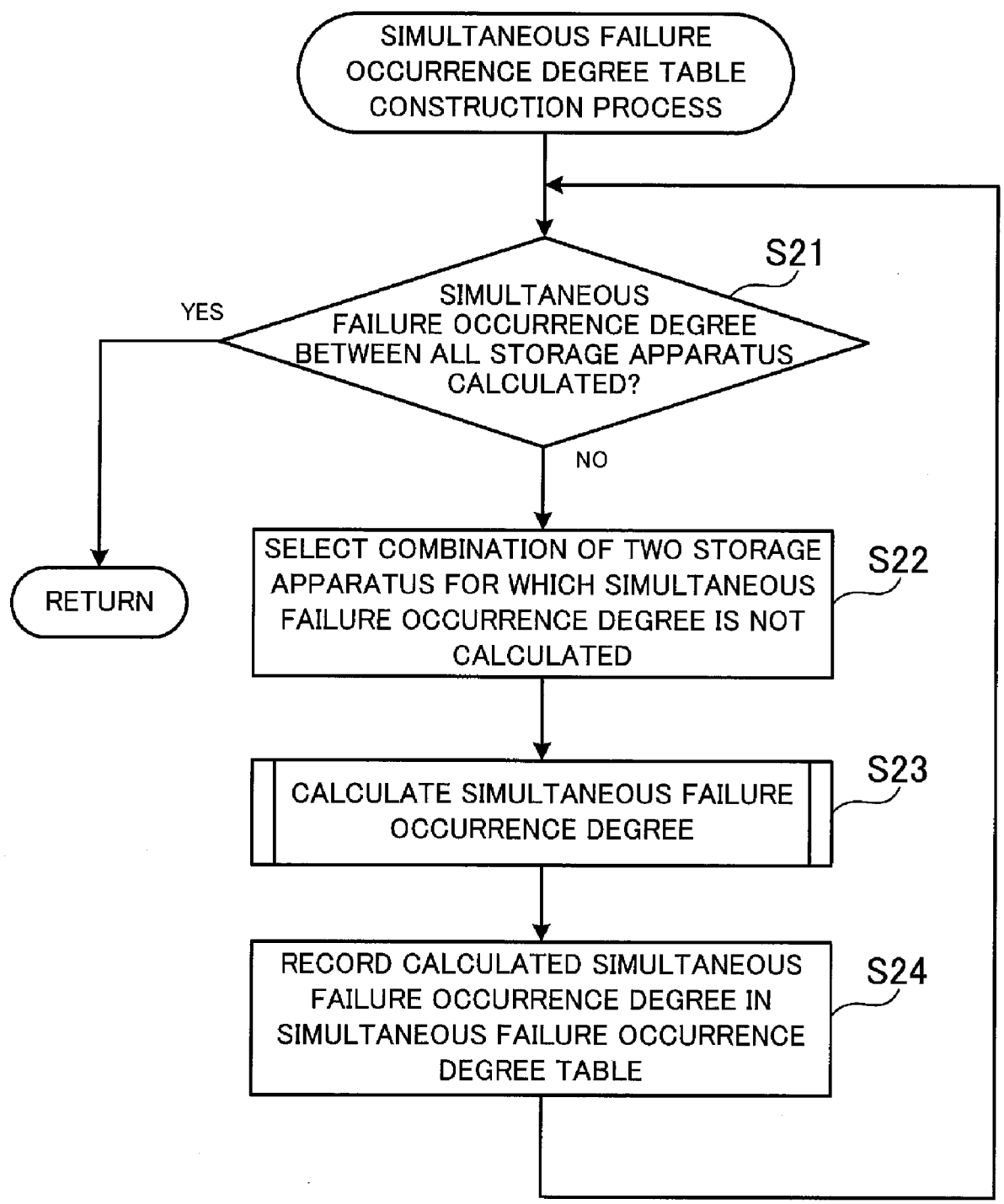
FIG. 8 illustrates a flow chart of a procedure for a simultaneous failure occurrence degree table construction process.

FIG. 8 illustrates a flow chart of a procedure for a simultaneous failure occurrence degree table construction process. The process illustrated in FIG. 8 will now be described in order of step number.

Step S21: The simultaneous failure occurrence degree table construction section 511 determines whether the calculation of a simultaneous failure occurrence degree between all the storage apparatus is completed. If the calculation of a simultaneous failure occurrence degree between all the storage apparatus is completed, then the process ends. If there is a combination of storage apparatus for which a simultaneous failure occurrence degree is not calculated, then step S22 is performed.

Step S22: The simultaneous failure occurrence degree table construction section 511 selects the combination of two storage apparatus for which a simultaneous failure occurrence degree is not calculated.

Step S23: The simultaneous failure occurrence degree table construction section 511 calculates a simultaneous failure occurrence degree for the selected combination of storage apparatus. The details of this step will be described later (see FIG. 9).

Step S24: The simultaneous failure occurrence degree table construction section 511 records the calculated simultaneous failure occurrence degree in the simultaneous failure occurrence degree table. After that, step S21 is performed.

The details of a process for calculating a simultaneous failure occurrence degree will now be described.

Figure 9:
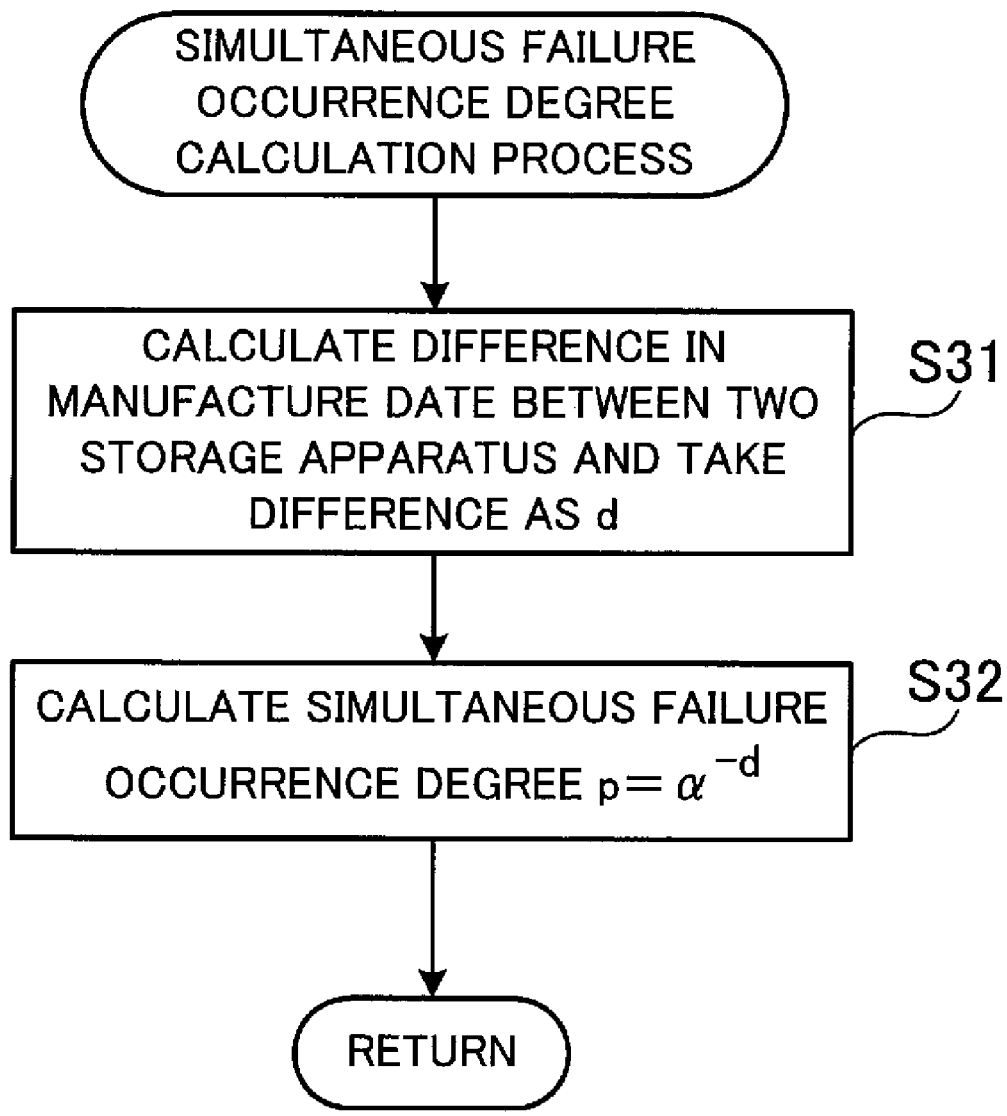
FIG. 9 illustrates a flow chart of a procedure for a simultaneous failure occurrence degree calculation process.

FIG. 9 illustrates a flow chart of a procedure for a simultaneous failure occurrence degree calculation process. The process illustrated in FIG. 9 will now be described in order of step number.

Step S31: The simultaneous failure occurrence degree table construction section 511 calculates a difference in manufacture date between two storage apparatus and takes the difference as d (integer which is greater than or equal to 0).

Step S32: The simultaneous failure occurrence degree table construction section 511 takes a simultaneous failure occurrence degree p as "$p=\alpha^{-d}$" where $\alpha$ is a constant (real number which is greater than 0) determined on the basis of information regarding the quality of a HDD (such as the value of mean time between failure (MTBF) or the number of HDDs included in one storage apparatus).

The simultaneous failure occurrence degree table is constructed in this way. The simultaneous failure occurrence degree table constructed is stored in the simultaneous failure occurrence degree table storage section 512. It is assumed that $\alpha=2$, that the date of the manufacture of the storage apparatus 110 the identification number of which is "SN-1" is 1 Apr. 2007, that the date of the manufacture of the storage apparatus 210 the identification number of which is "SN-2" is 2 Apr. 2007, that the date of the manufacture of the storage apparatus 310 the identification number of which is "SN-3" is 3 Apr. 2007, and that the date of the manufacture of the storage apparatus 410 the identification number of which is "SN-4" is 4 Apr. 2007. In this case, a simultaneous failure occurrence degree table illustrated in FIG. 10 is constructed.

FIG. 10 illustrates an example data structure of a simultaneous failure occurrence degree table. A simultaneous failure occurrence degree table 512a is a table in matrix form in which the node identifiers of the storage nodes are set as labels arranged horizontally and vertically. When any two storage nodes are selected, a simultaneous failure occurrence degree for a combination of the selected storage apparatus appears at a position where the node identifiers of the selected storage node correspond to one of the labels arranged horizontally and one of the labels arranged vertically.

The difference d in manufacture date between the storage apparatus 110 connected to the storage node 100 the node identifier of which is "SN-A" and the storage apparatus 210 connected to the storage node 200 the node identifier of which is "SN-B" is one day. Accordingly, simultaneous failure occurrence degree p=0.5. The difference d in manufacture date between the storage apparatus 110 connected to the storage node 100 the node identifier of which is "SN-A" and the storage apparatus 310 connected to the storage node 300 the node identifier of which is "SN-C" is two days. Accordingly, simultaneous failure occurrence degree p=0.25. The difference d in manufacture date between the storage apparatus 110 connected to the storage node 100 the node identifier of which is "SN-A" and the storage apparatus 410 connected to the storage node 400 the node identifier of which is "SN-D" is three days. Accordingly, simultaneous failure occurrence degree p=0.125. Simultaneous failure occurrence degrees for all the combinations of storage apparatus are calculated in the same way and are set in the simultaneous failure occurrence degree table 512a.

The details of a slice assignment process will now be described.

Figure 11:
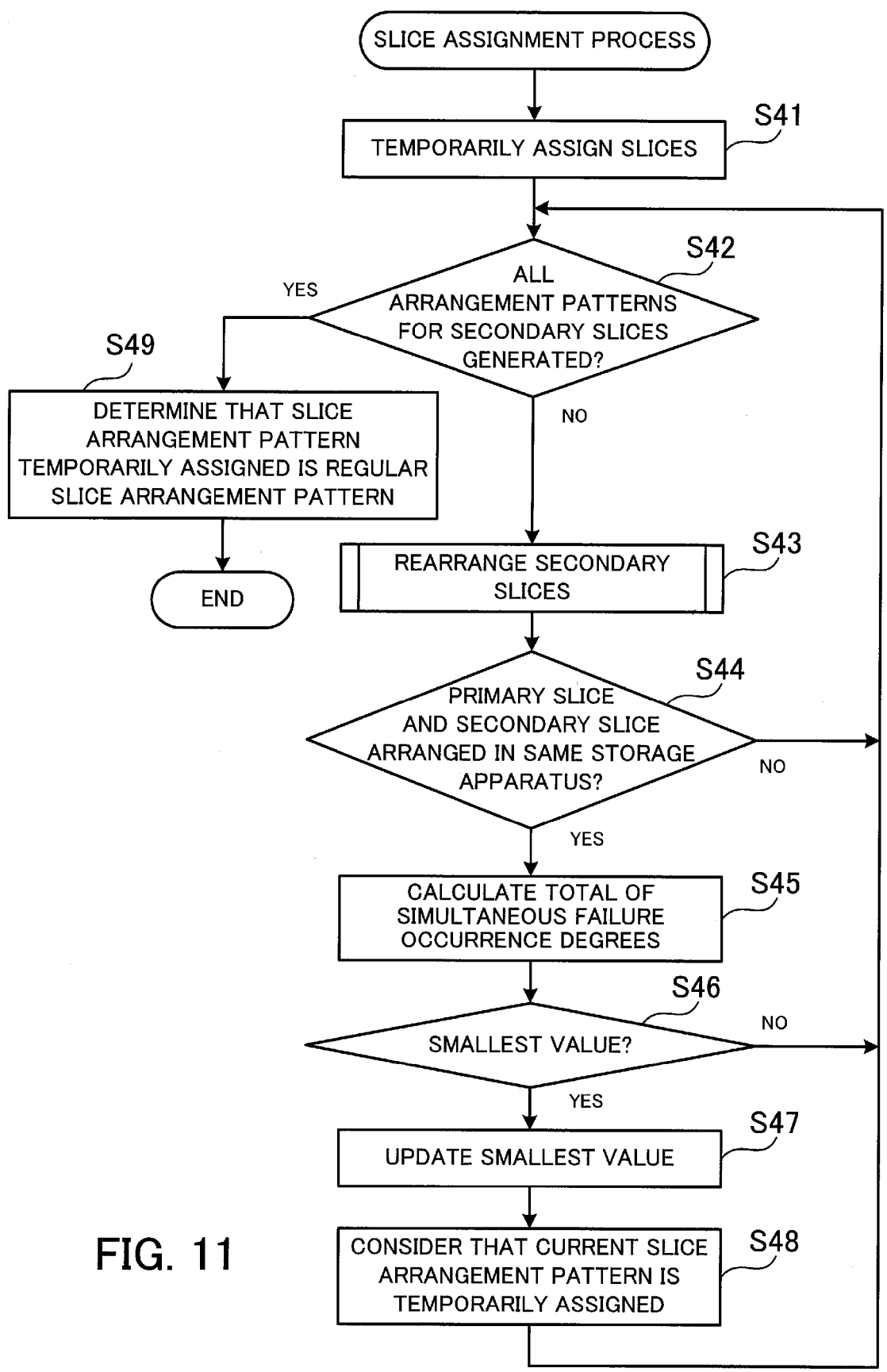
FIG. 11 illustrates a flow chart of a procedure for a slice assignment process.

FIG. 11 illustrates a flow chart of a procedure for a slice assignment process. The process illustrated in FIG. 11 will now be described in order of step number.

Step S41: The slice assignment section 513 temporarily assigns slices. To be concrete, the slice assignment section 513 determines which slices in the storage apparatus 110, 210, 310, and 410 are assigned to a primary slice and a secondary slice included in each of the segments 810, 820, 830, and 840 in the logical volume 800. At this time it is necessary to assign slices in different storage apparatus to a primary slice and a secondary slice included in one segment.

For example, the slice assignment section 513 extracts slices from the storage apparatus 110, 210, 310, and 410 in that order and assigns the slices to primary slices included in the segments 810, 820, 830, and 840. The slice assignment section 513 then extracts slices from the storage apparatus 210, 310, 410, and 110 in that order and assigns the slices to secondary slices included in the segments 810, 820, 830, and 840.

The arrangement pattern of slices temporarily assigned (correspondence between a segment and the node identifiers of storage nodes which manage slices assigned to a primary slice and a secondary slice included in the segment) is temporarily stored in the RAM 502.

Step S42: The slice assignment section 513 determines whether all arrangement patterns for the secondary slices are generated. For example, the slice assignment section 513 calculates the number of arrangement patterns which can be generated from the number of the segments and the number of the storage apparatus. If the number of arrangement patterns generated becomes equal to the number of the arrangement patterns which can be generated, then the slice assignment section 513 determines that all the arrangement patterns are generated. If all the arrangement patterns are generated, then step S49 is performed. If there is an arrangement pattern which is not yet generated, then step S43 is performed.

Step S43: The slice assignment section 513 rearranges the secondary slices. In addition to the arrangement patterns generated formerly, arrangement patterns generated after the rearrangement are stored in the RAM 502. The details of this step will be described later (see FIG. 12).

Step S44: The slice assignment section 513 determines whether a segment a primary slice and a secondary slice in which are arranged in a same storage apparatus is included in the arrangement patterns generated after the rearrangement of the secondary slices. If a corresponding segment is included in the arrangement patterns, then step S42 is performed. If a corresponding segment is not included in the arrangement patterns, then step S45 is performed.

Step S45: The slice assignment section 513 acquires a simultaneous failure occurrence degree for storage apparatus in which a primary slice and a secondary slice in each segment are arranged from the simultaneous failure occurrence degree table 512a on the basis of the arrangement patterns generated in step S43 after the rearrangement. The slice assignment section 513 then calculates a total of a simultaneous failure occurrence degree for storage apparatus in which a primary slice and a secondary slice in each segment are arranged.

Step S46: The slice assignment section 513 compares the total of simultaneous failure occurrence degrees calculated in step S45 with a total of simultaneous failure occurrence degrees for the arrangement patterns generated formerly and determines whether the total of the simultaneous failure occurrence degrees calculated in step S45 is the smallest value. To be concrete, the smallest value of the total of simultaneous failure occurrence degrees for the arrangement patterns generated formerly is stored in the RAM 502. Therefore, the slice assignment section 513 compares the total of the simultaneous failure occurrence degrees newly calculated with the smallest value stored. If the total of the simultaneous failure occurrence degrees newly calculated is smaller than the smallest value stored, then the slice assignment section 513 determines that the total of the simultaneous failure occurrence degrees newly calculated is the smallest value. If the total of the simultaneous failure occurrence degrees newly calculated is the smallest value, then step S47 is performed. If the total of the simultaneous failure occurrence degrees newly calculated is not the smallest value, then step S42 is performed.

Step S47: The slice assignment section 513 stores the total of the simultaneous failure occurrence degrees calculated in step S45 in the RAM 502 as the smallest value.

Step S48: The slice assignment section 513 considers that the current slice arrangement pattern is temporarily assigned. After that, step S42 is performed.

Step S49: After all the arrangement patterns are generated, the slice assignment section 513 determines that a slice arrangement pattern temporarily assigned at that time is a regular slice arrangement pattern.

Figure 12:
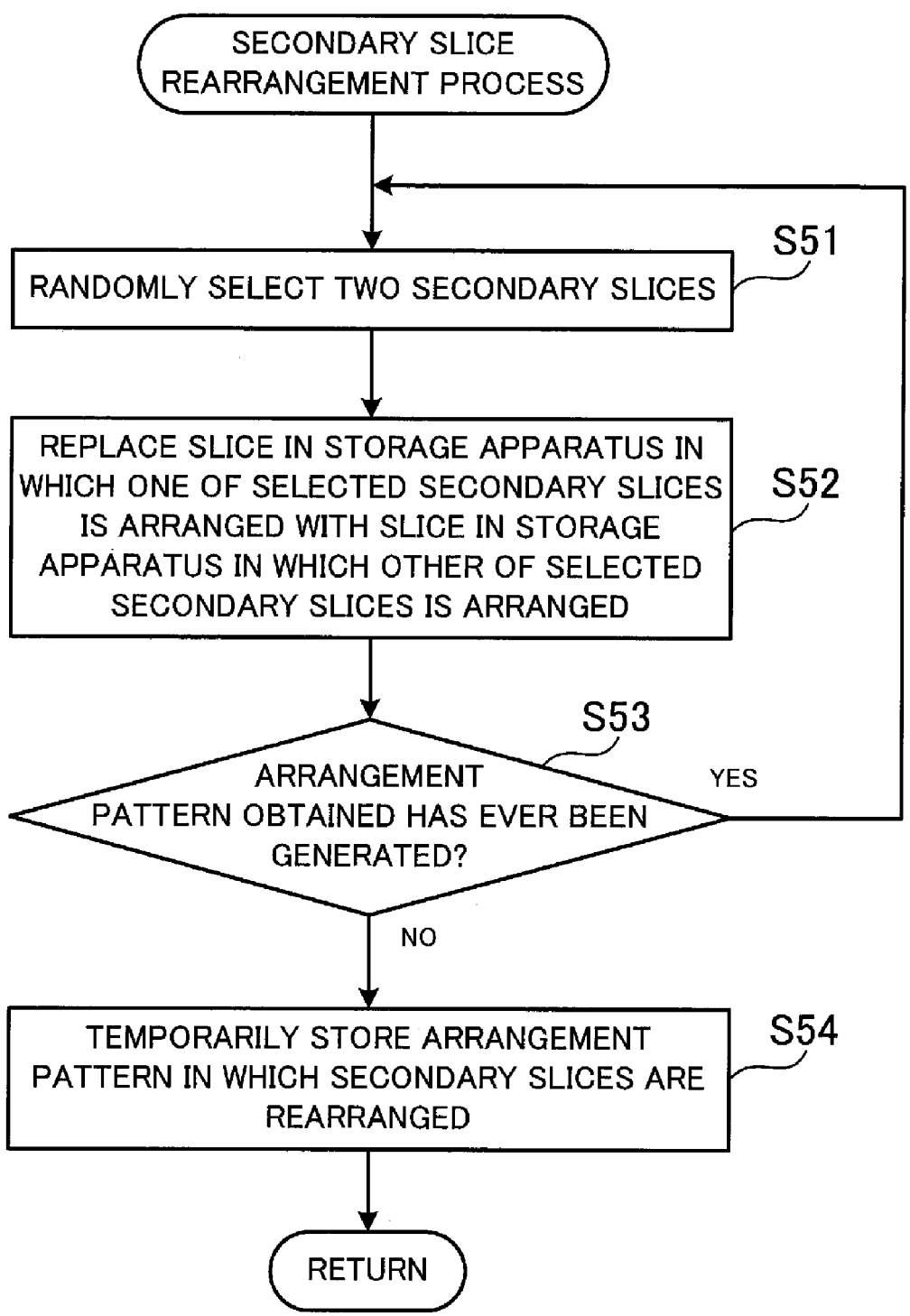
FIG. 12 illustrates a flow chart of a procedure for a secondary slice rearrangement process.

FIG. 12 illustrates a flow chart of a procedure for a secondary slice rearrangement process. The process illustrated in FIG. 12 will now be described in order of step number.

Step S51: The slice assignment section 513 randomly selects two secondary slices from the arrangement patterns set as the temporary assignment. If the procedure returns from step S53, the slice assignment section 513 randomly selects two secondary slices from arrangement patterns obtained by performing replacement in step S52.

Step S52: The slice assignment section 513 replaces a slice in a storage apparatus in which one of the selected secondary slices is arranged with a slice in a storage apparatus in which the other of the selected secondary slices is arranged, and generates a new arrangement pattern.

Step S53: The slice assignment section 513 determines whether the arrangement pattern obtained by performing the replacement in step S52 has ever been generated. To be concrete, the slice assignment section 513 compares the arrangement pattern obtained by performing the replacement in step S52 with the arrangement patterns which were generated formerly and which are stored in the RAM 502, and determines whether the same arrangement pattern that is obtained by performing the replacement in step S52 is stored in the RAM 502. If the arrangement pattern obtained by performing the replacement in step S52 has ever been generated, then step S51 is performed. If the arrangement pattern obtained by performing the replacement in step S52 is a new arrangement pattern, then step S54 is performed.

Step S54: The slice assignment section 513 temporarily stores the arrangement pattern in which the secondary slices are rearranged by performing the replacement in step S52 in the RAM 502 (arrangement pattern is stored in addition to the arrangement patterns which are already stored).

The result of slice assignment is indicated in the above way by one of all the arrangement patterns for which the total of simultaneous failure occurrence degrees is the smallest.

Figure 13A:
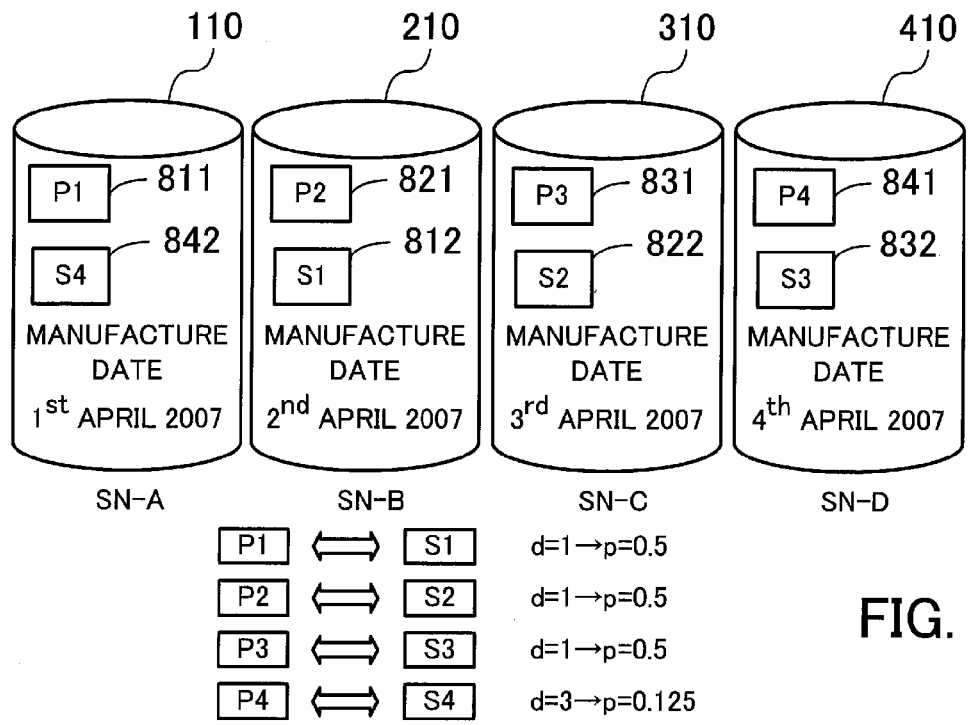
FIGS. 13A and 13B are views for describing a total of simultaneous failure occurrence degrees according to slice arrangement patterns.
Figure 13B:
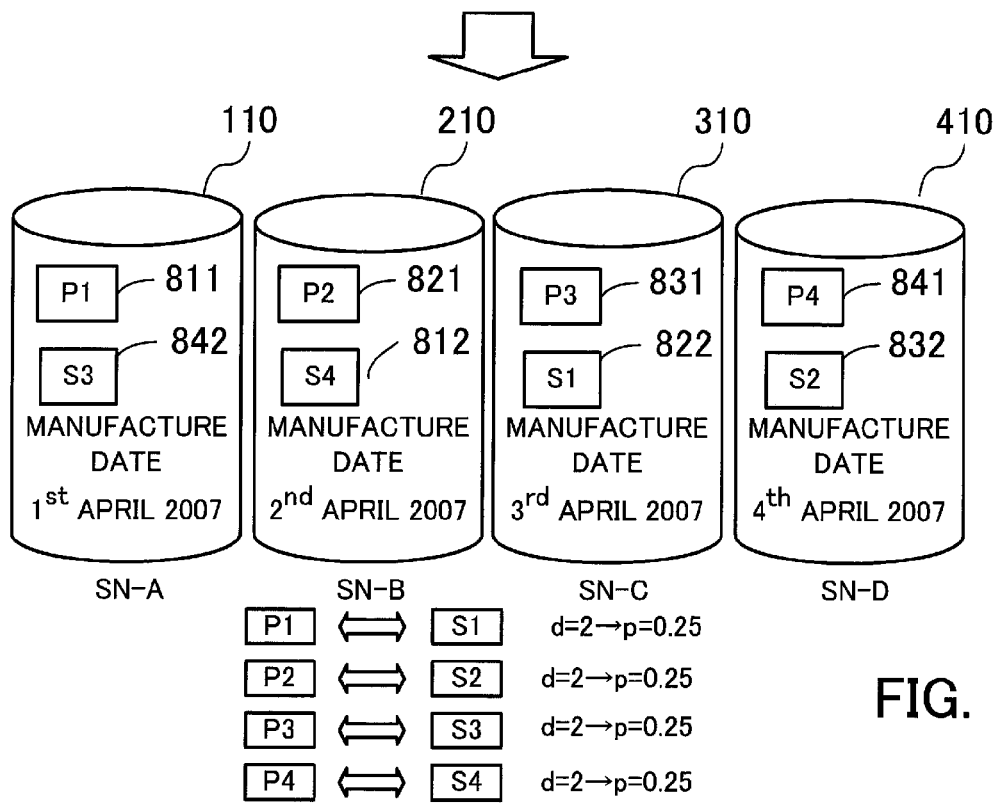

FIGS. 13A and 13B are views for describing a total of simultaneous failure occurrence degrees according to slice arrangement patterns. FIG. 13A illustrates an example arrangement pattern generated by performing temporary assignment. FIG. 13B illustrates a regular arrangement pattern.

With an arrangement pattern generated by performing temporary assignment, a slice in the storage apparatus 110 connected to the storage node 100 the node identifier of which is "SN-A" is assigned to the primary slice 811 in the segment 810. A slice in the storage apparatus 210 connected to the storage node 200 the node identifier of which is "SN-B" is assigned to the secondary slice 812 in the segment 810.

The date of the manufacture of the HDDs in the storage apparatus 110 is 1 Apr. 2007. The date of the manufacture of the HDDs in the storage apparatus 210 is 2 Apr. 2007. Accordingly, a difference d in manufacture date between the storage apparatus 110 and 210 assigned to the primary slice 811 and the secondary slice 812, respectively, in the segment 810 is one day. As a result, a simultaneous failure occurrence degree p for the storage apparatus assigned to the primary slice 811 and the secondary slice 812 in the segment 810 is 0.5 (if constant $\alpha=2$). By referring to the simultaneous failure occurrence degree table 512a (see FIG. 10), the slice assignment section 513 recognizes a simultaneous failure occurrence degree p for storage apparatus which are connected to two storage nodes temporarily assigned.

Similarly, a simultaneous failure occurrence degree p for the storage apparatus assigned to the primary slice 821 and the secondary slice 822 in the segment 820 is 0.5. A simultaneous failure occurrence degree p for the storage apparatus assigned to the primary slice 831 and the secondary slice 832 in the segment 830 is 0.5. A simultaneous failure occurrence degree p for the storage apparatus assigned to the primary slice 841 and the secondary slice 842 in the segment 840 is 0.125. As a result, the total of the simultaneous failure occurrence degrees is 1.625.

The secondary slices are rearranged on the basis of the arrangement pattern generated by performing temporary assignment in this way. As a result, an arrangement pattern illustrated in FIG. 13B is generated. In the examples illustrated in FIGS. 13A and 13B, a slice in the storage apparatus 310 connected to the storage node 300 the node identifier of which is "SN-C" is assigned to the secondary slice 812 in the segment 810.

The date of the manufacture of the HDDs in the storage apparatus 110 is 1 Apr. 2007. The date of the manufacture of the HDDs in the storage apparatus 310 is 3 Apr. 2007. Accordingly, a difference d in manufacture date between the storage apparatus assigned to the primary slice 811 and the secondary slice 812 in the segment 810 is two days. As a result, a simultaneous failure occurrence degree p for the storage apparatus assigned to the primary slice 811 and the secondary slice 812 in the segment 810 is 0.25 (if constant $\alpha=2$).

Similarly, a simultaneous failure occurrence degree p for the storage apparatus assigned to the primary slice 821 and the secondary slice 822 in the segment 820 is 0.25. A simultaneous failure occurrence degree p for the storage apparatus assigned to the primary slice 831 and the secondary slice 832 in the segment 830 is 0.25. A simultaneous failure occurrence degree p for the storage apparatus assigned to the primary slice 841 and the secondary slice 842 in the segment 840 is 0.25. As a result, the total of the simultaneous failure occurrence degrees is 1.

By rearranging the secondary slices in this way, an arrangement pattern for which the total of simultaneous failure occurrence degrees is smaller is generated.

Meta-data is generated in accordance with such a regular arrangement pattern.

Figure 14:
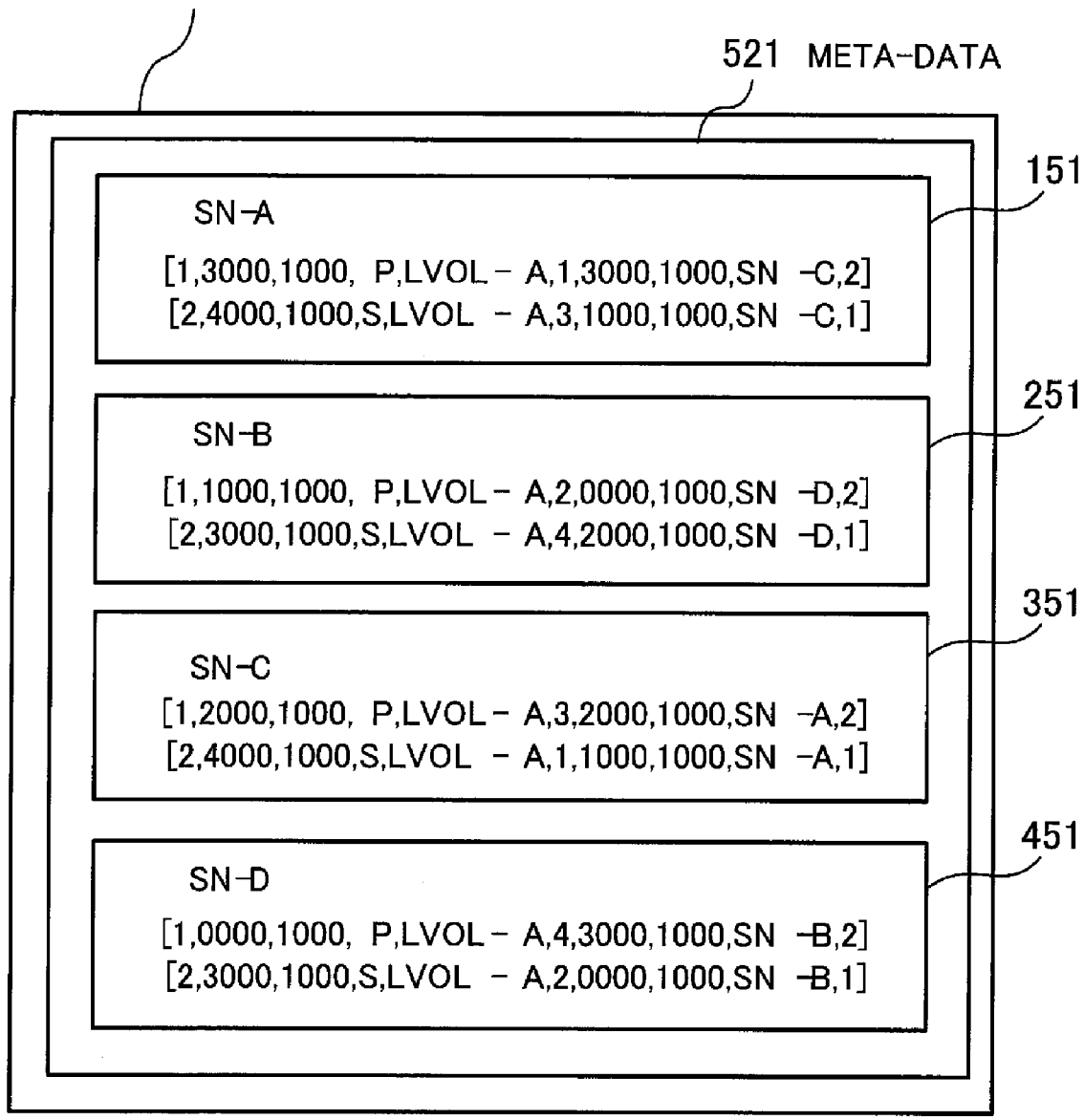
FIG. 14 illustrates an example data structure of meta-data stored in a meta-data storage section.

FIG. 14 illustrates an example data structure of meta-data stored in a meta-data storage section. The meta-data storage unit 520 stores meta-data 521. In this example, the meta-data 521 is classified into slice management information 151, 251, 351, and 451 sent to the storage nodes 100, 200, 300, and 400 respectively. The node identifiers of the storage nodes 100, 200, 300, and 400 to which the slice management information 151, 251, 351, and 451 is sent are indicated in the slice management information 151, 251, 351, and 451 respectively.

The following are components from the left of the slice management information 151, 251, 351, and 451.

slice number
start block position (number of leading block in corresponding slice)
number of blocks (number of blocks in slice)
flag (primary/secondary)
logical volume identifier
segment number
start of logical volume block position
number of blocks in logical volume
identifier of paired storage node
number of paired slice The above slice management information 151, 251, 351, and 451 is sent to the storage nodes 100, 200, 300, and 400 respectively. The data management units 140, 240, 340, and 440 included in the storage nodes 100, 200, 300, and 400 store the slice management information 151, 251, 351, and 451 in the slice management information storage units 150, 250, 350, and 450 respectively.

Figure 15:
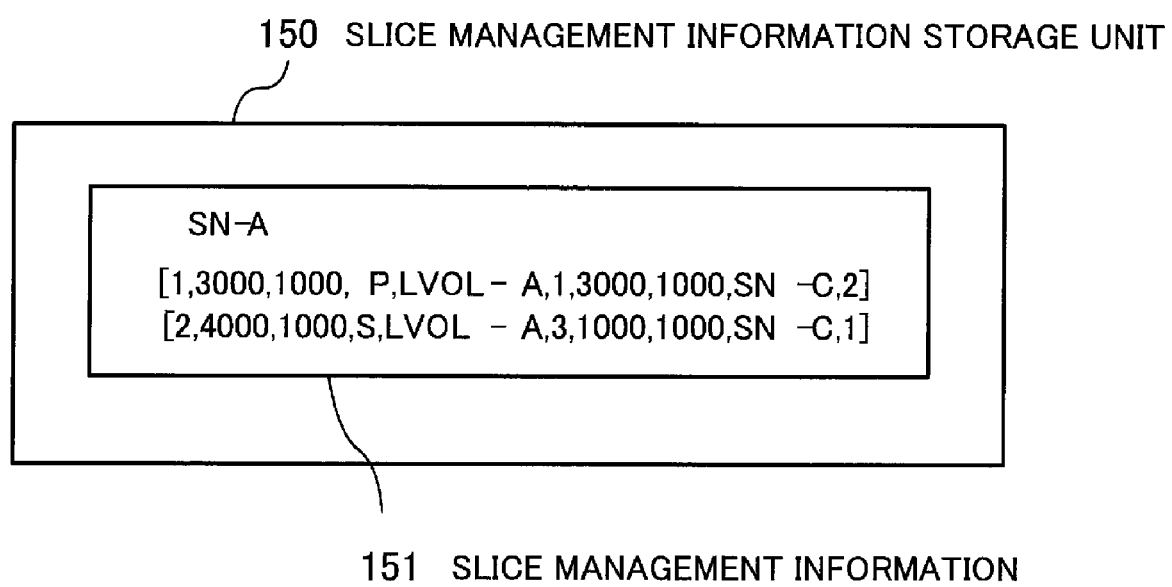
FIG. 15 illustrates an example data structure of slice management information.

FIG. 15 illustrates an example data structure of slice management information. In FIG. 15, the slice management information 151 stored in the slice management information storage unit 150 included in the storage node 100 the node identifier of which is "SN-A" is taken as an example.

The slice management information 151 illustrated in FIG. 15 is included in the logical volume 800 illustrated in FIG. 4. For example, the slice management information 151 for the node identifier "SN-A" means that a slice the slice number of which is "1" is a primary slice included in a segment the segment number of which is "1" and which is included in a logical volume the logical volume identifier of which is "LVOL-A." In addition, the slice management information 151 for the node identifier "SN-A" means that the slice the slice number of which is "1" is paired with a slice the slice number of which is "2" and which is managed by a storage node the node identifier of which is "SN-C." Slice management information similar to the slice management information 151 is stored in the slice management information storage units 250, 350, and 450 included in the storage nodes 200, 300, and 400 respectively.

The slice management information 151, 251, 351, and 451 sent to the storage nodes 100, 200, 300, and 400, respectively, is held in the storage nodes 100, 200, 300, and 400 even after the operation of the system is stopped. When the operation of the system is resumed, the slice management information 151, 251, 351, and 451 sent to the storage nodes 100, 200, 300, and 400, respectively, is acquired by the control node 500. The meta-data 521 is then restructured by the meta-data management section 515 of the control node 500.

When the operation of the system is begun, the control node 500 sends the access node 600 logical volume information. The logical volume information is generated on the basis of the meta-data 521 by the meta-data management section 515. The logical volume access control unit 610 of the access node 600 receives logical volume information and stores the logical volume information in the logical volume information storage unit 620.

Figure 16:
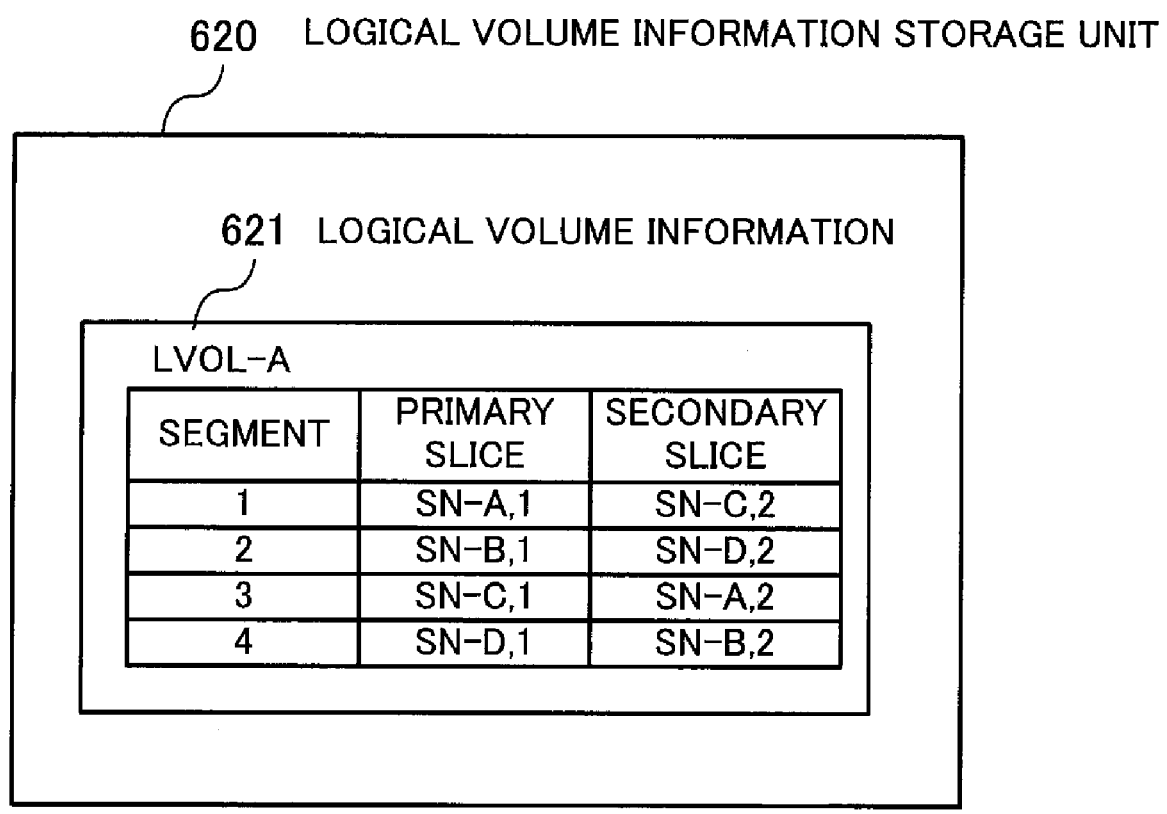
FIG. 16 illustrates an example data structure of logical volume information.

FIG. 16 illustrates an example data structure of logical volume information. The logical volume identifier "LVOL-A" for identifying a logical volume is given to logical volume information 621 stored in the logical volume information storage unit 620. The logical volume information 621 includes Segment, Primary Slice, and Secondary Slice columns.

A segment number is set in the Segment column. A node identifier of a storage node to which a primary slice corresponding to a segment indicated by the segment number is assigned and the number of a slice in a storage apparatus connected to the storage node are set in the Primary Slice column. A node identifier of a storage node to which a secondary slice corresponding to the segment indicated by the segment number is assigned and the number of a slice in a storage apparatus connected to the storage node are set in the Secondary Slice column.

By referring to the logical volume information 621, the logical volume access control unit 610 of the access node 600 can determine a storage node to be accessed corresponding to an access request. For example, if the logical volume access control unit 610 receives a request to access the segment "1" in the logical volume "LVOL-A," then the logical volume access control unit 610 refers to the logical volume information 621 and recognizes that the slice "1" managed by the storage node 100 the node identifier of which is "SN-A" is assigned to a primary slice in the segment "1." Accordingly, the logical volume access control unit 610 sends the storage node 100 an access request. An access to the segment "1" in the logical volume "LVOL-A" is requested in the access request.

The data access unit 130 of the storage node 100 refers to the slice management information 151 and determines that a slice corresponding to the segment "1" in the logical volume "LVOL-A" is the slice "1" in the storage apparatus 110. The data access unit 130 then gains access to the slice "1" in the storage apparatus 110 and returns an access result to the logical volume access control unit 610. If the access request is made to read data, then the data read is returned as the access result. If the access request is made to write data, then notice of write completion is returned as the access result.

If the access request is made to write data, then the data is written to a slice. In this case, data duplication is performed between this slice and a second slice. The data management unit 140 refers to the slice management information 151 and determines the second slice. The data management unit 140 then sends a data management unit included in a storage node which manages the second slice a request to write the same new data. When notice of write completion corresponding to the write request is returned, the data access unit 130 determines that the writing of the data is completed, and sends the access node 600 notice of write completion.

A pair of storage nodes can be generated in the above way in the distributed storage system for performing data duplication. By doing so, the longest possible interval exists between the dates of the manufacture of HDDs in storage apparatus. This reduces the possibility that HDDs between which data duplication is performed will break down simultaneously due to a lot failure.

In the description of the principles of the present invention by the use of FIG. 1, storage apparatus are combined and combination patterns are generated. In this embodiment, arrangement patterns are generated by assigning slices. The description of the principles of the present invention and this embodiment differ in this respect. In this embodiment, combination patterns may be generated by combining storage apparatus. In this case, one of the combination patterns for which a simultaneous failure occurrence degree is the smallest is determined. Combinations of storage apparatus included in the determined combination pattern are assigned to a primary slice and a secondary slice in a segment.

However, the great merit of the distributed storage system according to this embodiment is that it can be extended only by connecting a storage node to which a storage apparatus is connected to the switch 10. If combinations of two storage apparatus are used, then an even number of storage apparatus are necessary for performing duplication of all data. That is to say, it makes no sense to add only one storage node to which a storage apparatus is connected.

Accordingly, in this embodiment an arrangement pattern is optimized by assigning slices. By doing so, the probability that failures occur simultaneously is decreased. As a result, even if the number of storage apparatus is odd, it is possible to perform mirroring with high reliability, while making effective use of the resources of the storage apparatus. In addition, the throughput of the system can be enhanced by adding storage apparatus to the system one at a time. That is to say, the system can be extended flexibly.

Second Embodiment

In a second embodiment a predetermined number of arrangement patterns are generated at the time of secondary slices being rearranged. After the predetermined number of arrangement patterns are generated, the process ends. That is to say, in the first embodiment all the arrangement patterns are generated at the time of the secondary slices being rearranged. However, as the number of storage nodes or the number of segments in a logical volume increases, a processing load for generating all arrangement patterns becomes heavier. Therefore, in the second embodiment an arrangement pattern for which the total of simultaneous failure occurrence degrees is smallest is selected not from among all the arrangement patterns but from among the predetermined number of arrangement patterns generated.

Figure 17:
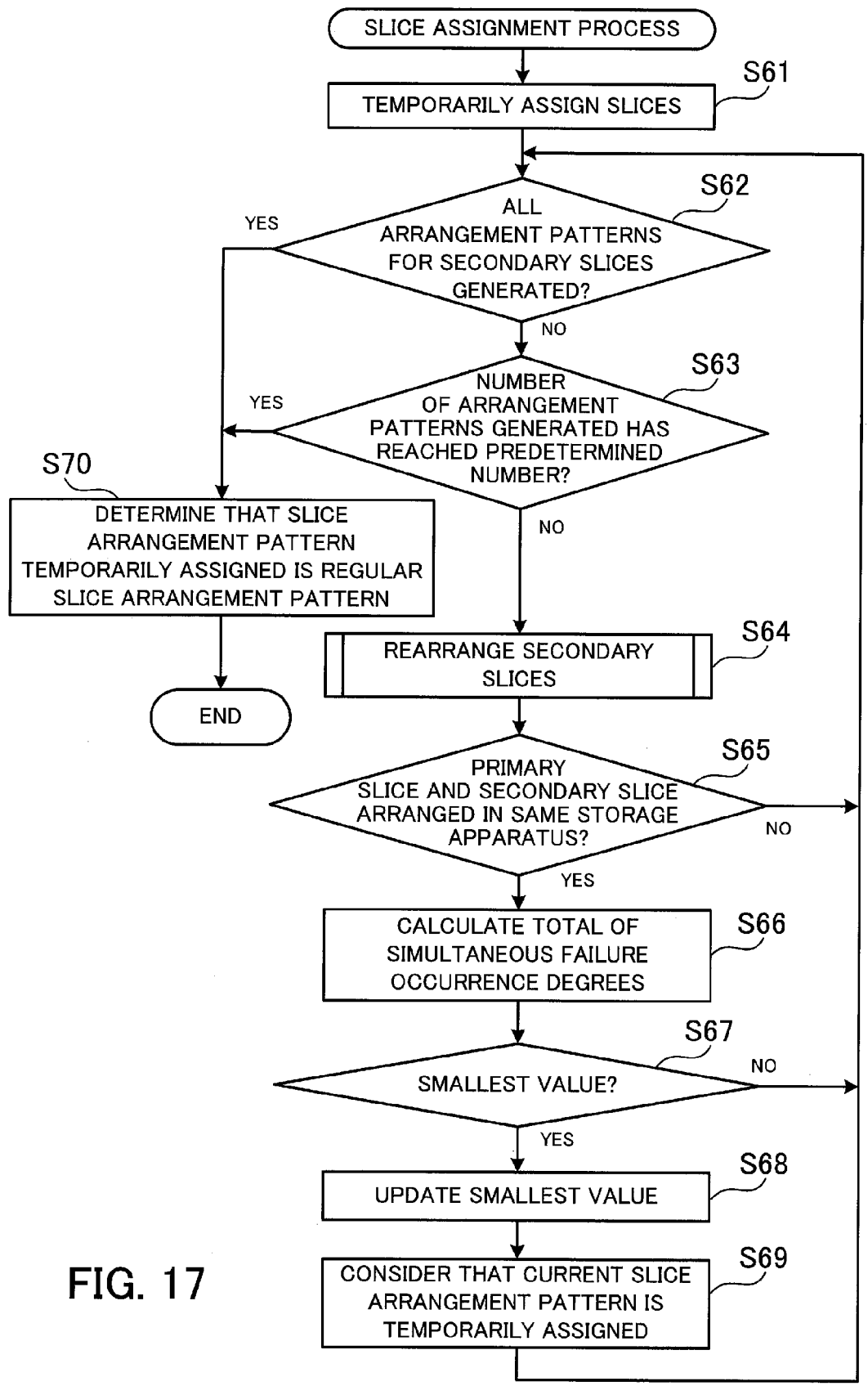
FIG. 17 illustrates a flow chart of a procedure for a slice assignment process in a second embodiment.

FIG. 17 illustrates a flow chart of a procedure for a slice assignment process in the second embodiment. Steps S61, S62, and S64 through S70 included in the slice assignment process illustrated in FIG. 17 are the same as steps S41 through S49, respectively, included in the slice assignment process in the first embodiment illustrated in FIG. 11. Accordingly, descriptions of steps S61, S62, and S64 through S70 will be omitted and only step S63 will be described.

Step S63: The slice assignment section 513 determines whether the number of arrangement patterns generated has reached the predetermined number. The predetermined number is a numeric value set in advance in the slice assignment section 513. If the number of arrangement patterns generated has reached the predetermined number, then step S70 is performed. If the number of arrangement patterns generated has not reached the predetermined number, then step S64 is performed.

At the time when the number of arrangement patterns reaches the predetermined number, the process of generating an arrangement pattern can be ended in this way.

(Other Modifications)

When the arrangement of slices has already been determined, slice assignment can be changed. In this case, steps will be performed in accordance with the flow chart of the procedure for the slice assignment process illustrated in FIG. 11 or 17, excluding temporarily assigning slices (step S41 or S61).

In the above descriptions it is assumed that the dates of the manufacture of HDDs included in one storage apparatus are the same. However, HDDs included in one storage apparatus may differ in manufacture date. In this case, a simultaneous failure occurrence degree can be calculated by the use of the following formula (it is assumed that slice assignment and slice rearrangement are performed according to storage nodes).

It is assumed that each of the storage apparatus 110 and 210 connected to the storage nodes 100 and 200, respectively, includes a plurality of HDDs. In this case, a simultaneous failure occurrence degree for the storage apparatus 110 and 210 is calculated by the following method.

It is assumed that a difference in manufacture date between an ith (i is an integer which is greater than or equal to 1 and which is smaller than or equal to the number of HDDs included in the storage apparatus 110) HDD managed by the storage node 100 and a jth (j is an integer which is greater than or equal to 1 and which is smaller than or equal to the number of HDDs included in the storage apparatus 210) HDD managed by the storage node 200 is dij (days). In this case, a simultaneous failure occurrence degree for the two HDDs is given by $p_{ij}=\alpha^{-d_{ij}}$.

The slice assignment section 513 calculates simultaneous failure occurrence degrees pij for all combinations of i and j. The slice assignment section 513 then considers the maximum value of the calculated simultaneous failure occurrence degrees as a simultaneous failure occurrence degree for the storage apparatus 110 and 210.

In the above descriptions each of the storage apparatus 110, 210, 310, and 410 is a RAID system using a plurality of built-in HDDs. In this case, viewed from the outside, each of the storage apparatus 110, 210, 310, and 410 is recognized as one real volume. However, HDDs included in each of the storage apparatus 110, 210, 310, and 410 may not make up a RAID system. That is to say, HDDs included in each of the storage apparatus 110, 210, 310, and 410 may be used as individual real volumes. In this case, the simultaneous failure occurrence degree table construction section 511 calculates simultaneous failure occurrence degrees for all combinations of HDDs included in the storage apparatus 110, 210, 310, and 410. The simultaneous failure occurrence degree table construction section 511 then constructs a simultaneous failure occurrence degree table in matrix form in which the identification numbers of the HDDs are set as labels arranged horizontally and vertically.

When the slice assignment section 513 performs a slice assignment process, the slice assignment section 513 acquires simultaneous failure occurrence degrees according to segments from the simultaneous failure occurrence degree table on the basis of the identification numbers of HDDs having slices assigned to a primary slice and a secondary slice in each segment. The slice assignment section 513 then determines an arrangement pattern for which the total of the simultaneous failure occurrence degrees acquired is the smallest (or one of generated arrangement patterns for which the total of simultaneous failure occurrence degrees is the smallest), and performs slice assignment or slice rearrangement in accordance with this arrangement pattern. By doing so, a simultaneous failure occurrence degree can be decreased.

In the above example it is assumed that the date of the manufacture of a HDD can be acquired. However, a manufacture date is not always recorded on a HDD or inside a storage apparatus. Accordingly, a date on which a storage apparatus (or a HDD) is connected to the distributed storage system may be used in place of a manufacture date. Each time the simultaneous failure occurrence degree table construction section 511 newly recognizes a HDD in each storage apparatus, the simultaneous failure occurrence degree table construction section 511 considers a date on which the simultaneous failure occurrence degree table construction section 511 recognizes the HDD as a connection date, associates the connection date with the identification number of the HDD, and stores the connection date. When the simultaneous failure occurrence degree table construction section 511 constructs a simultaneous failure occurrence degree table, the simultaneous failure occurrence degree table construction section 511 calculates a simultaneous failure occurrence degree by the use of connection dates in place of manufacture dates used in the above example.

If serial numbers are given in order of manufacture as the product numbers of HDDs, then the product numbers may be used in place of manufacture dates.

The above functions can be realized with a computer. In this case, a program in which the contents of the functions the storage node 100, 200, 300, or 400, the management node 700, or the access node 600 should have are described is provided. By executing this program on the computer, the above functions are realized on the computer. This program can be recorded on a computer readable record medium. A computer readable record medium can be a magnetic recording device, an optical disk, a magneto-optical recording medium, a semiconductor memory, or the like. A magnetic recording device can be a hard disk drive (HDD), a flexible disk (FD), a magnetic tape, or the like. An optical disk can be a digital versatile disk (DVD), a DVD-RAM, a compact disk read only memory (CD-ROM), a compact disc-recordable/rewritable (CD-R/RW) or the like. A magneto-optical recording medium can be a magneto-optical disk (MO) or the like.

To place the program on the market, portable record media, such as DVDs or CD-ROMs, on which it is recorded are sold. Alternatively, the program is stored in advance on a hard disk in a server computer and is transferred from the server computer to another computer via a network.

When the computer executes this program, it will store the program, which is recorded on a portable record medium or which is transferred from the server computer, on, for example, its hard disk. Then the computer reads the program from its hard disk and performs processes in compliance with the program. The computer can also read the program directly from a portable record medium and perform processes in compliance with the program. Furthermore, each time the program is transferred from the server computer, the computer can perform processes in turn in compliance with the program it receives.

In the present invention, a simultaneous failure occurrence degree for a combination of storage apparatus the value of which becomes smaller with an increase in difference in manufacture date information is calculated and mirroring is performed in accordance with one of combination patterns of storage apparatus for which the total of simultaneous failure occurrence degrees is the smallest. Therefore, mirroring is performed by the use of a combination of storage apparatus between the dates of the manufacture of which a long interval exists. As a result, the possibility that two storage apparatus between which mirroring is performed will break down simultaneously due to a lot failure is reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that various changes, substitutions, and alterations could be made hereto without departing from the spirit and scope of the invention.

What is claimed is:

1. A computer-readable, non-transitory medium storing a program that causes a computer to execute a procedure, the procedure comprising:

acquiring manufacture date information set as numeric values corresponding to dates of manufacture of a plurality of storage apparatus from the plurality of storage apparatus;

calculating a difference between numeric values indicative of the manufacture date information for each combination of two storage apparatus on the basis of the manufacture date information acquired;

calculating a simultaneous failure occurrence degree which becomes smaller with an increase in the difference between the numeric values indicative of the manufacture date information, and storing in a memory the simultaneous failure occurrence degree in association with each combination of two storage apparatus;

combining two of the plurality of storage apparatus, thereby generating a plurality of combination patterns;

acquiring, from the memory, the simultaneous failure occurrence degrees corresponding to combinations of storage apparatus for each of the plurality of combination patterns generated, and calculating a total of the simultaneous failure occurrence degrees acquired;

determining that a combination pattern for which the total of the simultaneous failure occurrence degrees is the smallest is a duplication combination pattern; and sending a mirroring device that performs mirroring by the use of the plurality of storage apparatus instructions to perform mirroring by the use of combinations of two storage apparatus indicated in the duplication combination pattern determined.

2. The computer-readable, non-transitory medium according to claim 1, wherein:

the mirroring is performed by a plurality of mirroring execution computers that cooperate with each other;

the acquiring of manufacture date information acquires the manufacture date information from each of the plurality of mirroring execution computers; and the sending sends the mirroring section included in each of the plurality of mirroring execution computers instructions to perform mirroring by the use of the combinations of two storage apparatus included in the duplication combination pattern.

3. The computer-readable, non-transitory medium according to claim 1, wherein the calculating of the simultaneous failure occurrence degree considers a predetermined constant and the difference between the numeric values indicative of the manufacture date information as a base and an index number, respectively, and treats an inverse number of a power of the predetermined constant as the simultaneous failure occurrence degree.

4. The computer-readable, non-transitory medium according to claim 1, wherein the generating generates all combination patterns which can be generated from the plurality of storage apparatus.

5. The computer-readable, non-transitory medium according to claim 1, wherein the generating generates a predetermined number of combination patterns.

6. The computer-readable, non-transitory medium according to claim 1, wherein:
   each of the plurality of storage apparatus includes a plurality of hard disk drives; and
   the acquiring of the manufacture date information acquires the manufacture date information for any hard disk drive as the manufacture date information for the storage apparatus.

7. The computer-readable, non-transitory medium according to claim 1, wherein:
   each of the plurality of storage apparatus includes a plurality of hard disk drives;
   the acquiring of the manufacture date information acquires the manufacture date information for all of the plurality of hard disk drives; and
   the calculating of the simultaneous failure occurrence degree calculates the simultaneous failure occurrence degree for each combination of two hard disk drives which can be formed by selecting one hard disk drive from each of storage apparatus which form a combination by the use of the manufacture date information for each of the two hard disk drives, and considers a highest value calculated as the simultaneous failure occurrence degree for the combination of storage apparatus.

8. A computer-readable, non-transitory medium storing a program that causes a computer to execute a procedure, the procedure comprising:
   acquiring manufacture date information set as numeric values corresponding to dates of manufacture of a plurality of storage apparatus from the plurality of storage apparatus;
   calculating a difference between numeric values indicative of the manufacture date information for each combination of two storage apparatus on the basis of the manufacture date information acquired;
   calculating a simultaneous failure occurrence degree which becomes smaller with an increase in the difference between the numeric values indicative of the manufacture date information, and storing in a memory the simultaneous failure occurrence degree in association with each combination of two storage apparatus;
   generating a plurality of arrangement patterns obtained by assigning a combination of two storage apparatus used for performing mirroring to each of a plurality of segments at the time of defining a logical volume in which a data storage area is divided into the plurality of segments and performing mirroring by the segment;
   acquiring, from the memory, the simultaneous failure occurrence degrees corresponding to combinations of storage apparatus for each of the plurality of arrangement patterns generated, and calculating a total of the simultaneous failure occurrence degrees acquired;
   determining that an arrangement pattern for which the total of the simultaneous failure occurrence degrees is the smallest is a duplication arrangement pattern; and
   sending a mirroring device that performs mirroring by the use of the plurality of storage apparatus instructions to perform mirroring by the segment by the use of combinations of two storage apparatus corresponding to each of the plurality of segments indicated in the duplication arrangement pattern determined.

9. A duplication combination management apparatus for determining a combination of storage apparatus between which data duplication is performed, the apparatus comprising:
   a simultaneous failure occurrence degree storage section which stores a simultaneous failure occurrence degree;
   a manufacture date information acquisition section which acquires manufacture date information set as numeric values corresponding to dates of manufacture of a plurality of storage apparatus from the plurality of storage apparatus;
   a simultaneous failure occurrence degree calculation section which calculates a difference between numeric values indicative of the manufacture date information for each combination of two storage apparatus on the basis of the manufacture date information acquired by the manufacture date information acquisition section, calculates a simultaneous failure occurrence degree which becomes smaller with an increase in the difference between the numeric values indicative of the manufacture date information, and stores the simultaneous failure occurrence degree in association with each combination of two storage apparatus in the simultaneous failure occurrence degree storage section;
   a combination pattern generation section which combines two of the plurality of storage apparatus, and thereby generates a plurality of combination patterns;
   a simultaneous failure occurrence degree adding section which acquires the simultaneous failure occurrence degrees corresponding to combinations of storage apparatus for each of the plurality of combination patterns generated by the combination pattern generation section from the simultaneous failure occurrence degree storage section, and calculates a total of the simultaneous failure occurrence degrees acquired;
   a duplication combination pattern determination section which determines that a combination pattern for which the total of the simultaneous failure occurrence degrees calculated by the simultaneous failure occurrence degree adding section is the smallest is a duplication combination pattern; and
   a mirroring instruction section which sends a mirroring section that performs mirroring by the use of the plurality of storage apparatus instructions to perform mirroring by the use of combinations of two storage apparatus indicated in the duplication combination pattern determined by the duplication combination pattern determination section.

10. A duplication combination management method for determining a combination of storage apparatus between which data duplication is performed with a computer, the method comprising:
   acquiring manufacture date information set as numeric values corresponding to dates of manufacture of a plurality of storage apparatus from the plurality of storage apparatus;
   calculating a difference between numeric values indicative of the manufacture date information for each combination of two storage apparatus on the basis of the manufacture date information acquired;
   calculating a simultaneous failure occurrence degree which becomes smaller with an increase in the difference between the numeric values indicative of the manufacture date information, and storing in a memory the simultaneous failure occurrence degree in association with each combination of two storage apparatus;

combining two of the plurality of storage apparatus, thereby generating a plurality of combination patterns;

acquiring, from the memory, the simultaneous failure occurrence degrees corresponding to combinations of storage apparatus for each of the plurality of combination patterns generated, and calculating a total of the simultaneous failure occurrence degrees acquired;

determining that a combination pattern for which the total of the simultaneous failure occurrence degrees is the smallest is a duplication combination pattern; and sending a mirroring device that performs mirroring by the use of the plurality of storage apparatus instructions to perform mirroring by the use of combinations of two storage apparatus indicated in the duplication combination pattern determined.

\* \* \* \* \*